United States Patent
Boncan et al.

[11] Patent Number: 6,145,591
[45] Date of Patent: Nov. 14, 2000

[54] METHOD AND COMPOSITIONS FOR USE IN CEMENTING

[75] Inventors: Virgilio G. Boncan, Spring; Dan T. Mueller, Cypress; Murray J. Rogers, Houston; Windall S. Bray, Cypress, all of Tex.

[73] Assignee: BJ Services Company, Houston, Tex.

[21] Appl. No.: 08/989,480

[22] Filed: Dec. 12, 1997

[51] Int. Cl.[7] .................................................. F21B 33/14
[52] U.S. Cl. ....................... 166/291; 166/292; 166/293; 106/614; 106/696; 106/718; 106/719
[58] Field of Search ................................... 166/292, 293, 166/309, 901, 291; 106/694, 695, 696, 718, 719, 811

[56] References Cited

U.S. PATENT DOCUMENTS

| | | | |
|---|---|---|---|
| 3,563,313 | 2/1971 | Spangle | 166/292 |
| 3,581,825 | 6/1971 | Messenger | 166/292 X |
| 3,887,385 | 6/1975 | Quist et al. | |
| 4,102,400 | 7/1978 | Crinkelmeyer et al. | 166/283 |
| 4,132,555 | 1/1979 | Barrable | |
| 4,202,413 | 5/1980 | Messenger | 166/292 |
| 4,257,483 | 3/1981 | Morris et al. | 166/292 |
| 4,274,881 | 6/1981 | Langton et al. | |
| 4,300,633 | 11/1981 | Stewart | 166/292 X |
| 4,328,036 | 5/1982 | Nelson et al. | |
| 4,478,640 | 10/1984 | Holland | |
| 4,482,379 | 11/1984 | Dibrell et al. | |
| 4,640,361 | 2/1987 | Smith et al. | 166/288 |
| 4,902,170 | 2/1990 | Knox et al. | 405/225 |
| 4,957,556 | 9/1990 | Kunbargi | 106/693 |
| 4,968,349 | 11/1990 | Virtanen | 106/707 |
| 5,058,679 | 10/1991 | Hale et al. | 166/293 |
| 5,106,423 | 4/1992 | Clarke | 106/789 |
| 5,125,455 | 6/1992 | Harris et al. | 166/292 |
| 5,159,980 | 11/1992 | Onan et al. | 166/294 |
| 5,183,506 | 2/1993 | Zhang | 106/739 |
| 5,293,938 | 3/1994 | Onan et al. | 166/293 |
| 5,343,950 | 9/1994 | Hale et al. | 166/293 |
| 5,421,409 | 6/1995 | Mueller et al. | 166/292 |
| 5,484,019 | 1/1996 | Griffith | 166/293 |
| 5,564,503 | 10/1996 | Longbottom et al. | 166/313 |
| 5,571,318 | 11/1996 | Griffith et al. | 106/725 |
| 5,588,488 | 12/1996 | Vijn et al. | 166/293 |
| 5,688,844 | 11/1997 | Chatterji et al. | 524/8 |
| 5,711,383 | 1/1998 | Terry et al. | 175/72 |

OTHER PUBLICATIONS

Ramachandran, V.S., "Concrete Admixtures Handbook Properties, Science, and Technology," Noyes Publications, Library of Congress No. 84–4125 (1984).

M–90–339 Silicate Portland Cement Admixture, Engelhard Corporation, Specialty Minerals and Colors.

Ratinov and Rozenberg, "Chap. 8—Antifreezing Admixtures" in Concrete Admixtures Handbook, Properties, Science, and Technology, Edited by V. S. Ramachandran, pp. 430–463, 1984.

Hogg, "Comparison of Multilateral Completion Scenarios and Their Application," SPE 38493, Society of Petroleum Engineers, Inc.; Offshore Europe Conference held in Aberdeen, Scotland, Sep. 9–12, 1997.

Morsy, El–Enein, Hanna, "Microstructure and Hydration Characteristics of Artificial Pozzolana–Cement Pastes Containing Burnt Kaolinite Clay," *Cement and Concrete Research*, 27(9), 1307, 1997.

(List continued on next page.)

*Primary Examiner*—George Suchfield
*Attorney, Agent, or Firm*—O'Keefe, Egan & Peterman

[57] ABSTRACT

Aluminum silicate-containing cement slurries for cementing wellbores in deepwater and cold environments, or in wellbores susceptible to fluid intrusion. The aluminum silicate-containing slurries may also be used as high strength, low density cements for wellbore cementing applications under a variety of conditions. The cement slurries typically comprise a mixture of a reactive aluminum silicate and hydraulic cement, and may include one or more other additives. The cement slurries may optionally be foamed using a foaming agent and energizing phase.

37 Claims, 11 Drawing Sheets

OTHER PUBLICATIONS

"MetaMax® High Reactivity Metakaolin (HRM) for Improved Pre–cast Concrete," Engelhard Corporation Pigments and Additives Group, C–8–E, Jan. 1997, 7 pages.

Thiercelin, Dargaud, Baret, Rodriguez "Cement Design Based on Cement Mechanical Response," SPE 38598, Society of Petroleum Engineers, Inc.; SPE Annual Technical Conference and Exhibition held in San Antonio, Texas, Oct. 5–8 1997.

Marsh, "An alternative to silica fume?" *Concrete Products,* EC–6729, Nov. 1994.

"Horizontal Drilling: Multi–Lateral and Twinned Wells," Sperry–Sun Drilling Services, 1993.

Low and Beaudoin, "The Flexural Toughness and Ductility of Portland Cement–Based Binders Reinforced With Wollastonite Micro–Fibres," Cement and Concrete Research, 24(2), 250, 1994.

Low and Beaudoin, "Flexural Strength and Microstructure of Cement Binders Reinforced With Wollastonite Micro–Fibres," 10 pages, (undated).

Rieger and Vanderbilt, "Talc, Pyrophyllite, and Wollastonite", pp 38–40, 42–44, (undated).

METHOD AND COMPOSITIONS FOR USE IN CEMENTING

BACKGROUND OF THE INVENTION

1. Field of the Invention

This invention relates generally to methods and compositions for cementing, and, more specifically to methods and compositions for cementing in deepwater and cold environments, as well as in environments where fluid influx or intrusion may be a problem during and after cementing. In particular, this invention relates to methods and compositions for well cementing utilizing mixtures of hydraulic cement and aluminum silicate.

2. Description of Related Art

Cementing is a common technique employed during many phases of wellbore operations. For example, cement may be employed to cement or secure various casing strings and/or liners in a well. In other cases, cementing may be used in remedial operations to repair casing and/or to achieve formation isolation. In still other cases, cementing may be employed during well abandonment. Cement operations performed in wellbores having relatively cool temperatures, ie., bottomhole circulating temperatures typically less than about 60° F., may present particular problems, among other things, in obtaining good wellbore isolation. These problems are exacerbated in those cases where wellbore and/or formation conditions promote fluid intrusion during or after cement curing, including intrusion of water, gas, or other fluids.

Deepwater well operations typically include operations performed on offshore wells drilled in water depths over about 1,000 feet (especially in Northern latitudes), more typically greater than about 2,000 feet deep. Under deepwater conditions, relatively cool temperatures promoted by seawater, in some cases coupled with poorly consolidated formations often make the prevention of fluid intrusion during cementing a challenge. In such cases, relatively cool temperatures (typically less than about 60° F., and more typically less than about 50° F.) may slow cement curing or hydration, extending the transition time of a cement slurry. Transition time may be defined as the time required for a cement slurry to develop gel strength, or quantitatively as the time for a cement slurry gel strength to go from 100 lb/100 ft$^2$ to 500 lb/100 ft$^2$.

Because longer transition times means that the gel strength of a cement increases relatively slowly, there is more opportunity for intrusion of water or other fluids, such as oil or gas, to migrate through or displace a cement slurry. When such fluid migration occurs, channels, pockets or other cavities may form in the setting cement. Such cavities or channels may create a permanent flow passage or otherwise compromise the integrity of a cement sheath, such as exists between a pipe string and a formation. Furthermore, intrusion of a fluid such as water may dilute a cement slurry and thus prevent it from developing sufficient compressive strength. Fluid migration into a cement is typically more extensive when cement transition times are lengthened because although the cement column in a wellbore has typically built enough gel strength to support itself and to thereby reduce hydrostatic pressure on the surrounding formation, it has not developed sufficient gel strength to prevent fluid hydration. Although reduced gel strength, extended transition times, and fluid intrusion during cement curing is commonly encountered in deepwater completions, such problems may also be encountered in any wellbore having relatively cool formation temperatures, such as in wellbores drilled in cool or cold climates.

In those cases where formation sands are overpressured by fluids such as gas and/or water, fluid intrusion into the setting cement during the cement transition time may be a particular problem. In this regard, shallow formations in deepwater wells typically are unconsolidated, making them weak, prone to fracture, and prone to producing relatively high flows of water. Such a problem may be further exacerbated in those situations in which a relatively lightweight cement slurry is required. Such situations include those in which formations are susceptible to fracture, such as naturally weak or unconsolidated formations, or those with reduced bottom-hole pressures. Lightweight cements typically have longer transition times at relatively cool formation temperatures. Such cements are often referred to as "water extended cement slurries." Due to the relatively long transition times of water extended or lightweight cement slurries, there is increased opportunity for fluid intrusion and cement contamination. Such contamination may result in the loss of formation isolation and/or in casing damage. Resulting cement job failures may result in many undesirable consequences, such as the need for expensive remedial work, increased rig time, loss of production, and/or loss of the wellbore itself.

In cold weather regions, such as the Arctic, the temperature of shallow formations may not exceed 32° F. for several hundred feet of depth. Such formations are typically referred to as "permafrost" which denotes a permanently frozen subsurface formation. Depending on the location, a permafrost or frozen section may extend from a few feet to depths greater than about 1500 feet. In such situations, even where fluid intrusion is not a problem, a cement slurry may not have the opportunity to set and provide needed strength before it freezes.

In some wellbores, gas intrusion may be a particular problem during and after cementing. Such wellbores include, for example, those where a wellbore penetrates a gas formation having a pressure corresponding to a first pressure gradient and a relatively underbalanced permeable zone having a pressure corresponding to a second pressure gradient that is lower than the first pressure gradient. In such cases, hydrostatic pressure exerted by the cement slurry may keep gas intrusion from occurring while the cement is still fluid. However, due to chemical hydration of the slurry and/or dehydration of the slurry across the permeable zone, the pore pressure of the slurry may decrease below the gas pressure in the reservoir allowing the gas to enter the cement. This underbalanced pressure may result, for example, in gas channeling to the surface or to another lower pressure permeable zone.

SUMMARY OF THE INVENTION

Cementing systems and methods are provided in which cement slurries may be formulated to achieve gel and/or compressive strength in relatively short periods of time compared to conventional well cements. Such cement systems are typically characterized by the ability to form cement slurries having relatively short transition times, a characteristic which may be particularly advantageous in cold environments and/or in wellbores having relatively weak formations and fracture gradients, both of which are typically found in deepwater offshore wells.

As disclosed herein, a typical cementing system may comprise an ASTM Type I cement, or other suitable hydraulic cement, mixed with reactive aluminum silicate. Optional additives to such a cement system include, but are not limited to, quick-setting gypsum, polyvinyl alcohol-based anti-fluid flow additives, accelerators (including calcium chloride and sodium metasilicate), and/or sufficient water to form a pumpable slurry. Such cement systems may be optionally foamed with, for example, nitrogen to produce stable and lightweight cement slurries. In one embodiment such a slurry develops, in less than about 35 minutes after placement, sufficient static gel strength to inhibit shallow water flow. In addition, such a slurry may obtain an initial compressive strength (e.g., about 50 psi) in less than about ten hours under seafloor conditions.

In one respect, this invention is a method of cementing within a wellbore located in a seafloor at a water depth greater than about 1000 feet, including the steps of introducing a cement slurry including a hydraulic cement and aluminum silicate into a wellbore, and allowing the cement slurry to set within the wellbore. The cement slurry may be introduced into an annulus existing between a pipe and the wellbore. The cement slurry is typically allowed to set at a temperature of less than about 60° F. Advantageously, the cement slurry substantially prevents intrusion of fluids into the wellbore prior to and after setting of the cement slurry. The cement slurry typically includes between about 1% and about 75% of aluminum silicate BWOC. The cement slurry may further include gypsum, and/or a foaming agent and energizing phase. The aluminum silicate may include at least one of kaolin, metakaolin, halloysite, dickite, nacrite, or a mixture thereof. Most typically, the aluminum silicate includes metakaolin. Advantageously, the cement slurry may have a transition time of about 35 minutes or less at a temperature of about 50° F.

In another respect, this invention is a method of cementing within a wellbore, including the steps of introducing a cement slurry including a hydraulic cement and aluminum silicate into a wellbore, and allowing the cement slurry to set within the wellbore at a temperature of less than about 60° F. The cement slurry may be introduced into an annulus existing between a pipe and the wellbore. Advantageously, the cement slurry may substantially prevent intrusion of fluids into the wellbore prior to and after setting of the cement slurry. The cement slurry typically includes between about 1% and about 75% of aluminum silicate BWOC. The cement slurry may further include gypsum and/or a foaming agent and energizing phase. Typically the aluminum silicate includes at least one of kaolin, metakaolin, halloysite, dickite, nacrite, or a mixture thereof. Most typically, the aluminum silicate includes metakaolin. Advantageously the cement slurry may have a transition time of about 35 minutes or less at a temperature of about 50° F.

In another respect, this invention is a method of cementing within a wellbore located in a seafloor at a water depth greater than about 1000 feet. The method includes the steps of introducing a cement slurry including a hydraulic cement, between about 1% and about 25% metakaolin BWOC, and a foaming agent and energizing phase into an annulus existing between a pipe and the wellbore, and allowing the cement slurry to set within the wellbore. Advantageously, the cement slurry may substantially prevent intrusion of fluids into the wellbore prior to and after setting of the cement slurry. Typically, the cement slurry is allowed to set at a temperature of less than about 60° F. The cement slurry may further include between about 1% and about 15% of gypsum BWOC, and/or may include from about 0.01 GPS to about 0.5 GPS of foaming agent and from about 50 SCF/bbl to about 2000 SCF/bbl of nitrogen energizing phase. Advantageously, the cement slurry may have a transition time of about 40 minutes or less at a temperature of about 50° F.

In another respect, this invention is a method of cementing within a wellbore in which the wellbore penetrates at least one formation having a pore pressure and is at least partially productive of a fluid. The method includes the steps of introducing a cement slurry including a hydraulic cement and aluminum silicate into a wellbore, and allowing the cement slurry to set within the wellbore. Advantageously, the cement slurry may substantially prevent intrusion of the fluid into the wellbore prior to and after setting of the cement slurry. The cement also substantially prevent intrusion of the fluid into the wellbore prior to setting of the cement when the cement pore pressure is less than the formation pore pressure. In some cases, the formation may be productive of a fluid that is gas. Typically, the cement slurry is introduced into an annulus existing between a pipe and the wellbore. The cement slurry may include between about 1% and about 75% of aluminum silicate BWOC, and may optionally further include gypsum. The aluminum silicate may include at least one of kaolin, metakaolin, halloysite, dickite, nacrite, or a mixture thereof. Most typically, the aluminum silicate includes metakaolin.

In another respect, this invention is a method of cementing within a wellbore, including the steps of introducing a cement slurry including a hydraulic cement and aluminum silicate into a wellbore, and allowing the cement slurry to set within the wellbore. In this method the aluminum silicate may include at least one of kaolin, metakaolin, halloysite, dickite, nacrite, or a mixture thereof. Most typically the aluminum silicate includes metakaolin. The slurry may have a slurry density of between about 11.5 lbm/gal and about 13.5 lbm/gal.

In another respect, this invention is a well cementing composition including a hydraulic cement and aluminum silicate. Typically the composition includes greater or equal to about 25%, more typically greater than or equal to about 30%, more typically greater than or equal to about 40%, more typically greater than or equal to about 50%, and most typically greater than or equal to about 60% by weight of one cubic foot of hydraulic cement, in addition to aluminum silicate. The hydraulic cement may be any of the hydraulic cements mentioned elsewhere herein. In this composition, the aluminum silicate may include at least one of kaolin, metakaolin, halloysite, dickite, nacrite, or a mixture thereof. Most typically, the aluminum silicate includes metakaolin. The aluminum silicate may be present in any amount disclosed elsewhere herein. Furthermore, any of the cementing additives mentioned elsewhere herein may be employed.

DESCRIPTION OF ILLUSTRATIVE EMBODIMENTS

The disclosed aluminum silicate-containing cement systems are useful for, among other things, cementing operations under wellbore conditions prone to fluid intrusion or influx during cement curing. In particular, the disclosed cement systems are useful in cementing operations performed in cold weather environments, deep-water completions, and/or in wellbores in which formations having varying pressure gradients are exposed. In the case of deepwater completions, embodiments of aluminum silicate-containing cement are disclosed which may be utilized to cement, for example, conductor pipe or casing in off-shore well operations located in deepwater, typically in water that is greater than about 1,000 feet, and most typically in water that is greater than about 2,000 feet. The disclosed cement systems are also useful in cementing in relatively cold wellbore or downhole environments, including wellbores having bottomhole circulating temperatures of less than about 60° F. Furthermore the disclosed cement systems are useful in cementing in wellbores susceptible gas influx or migration, such as those wellbores having exposed formations with varying pressure gradients, including such wells having conventional bottom hole temperatures. In addition, the disclosed cement systems may be formulated as high strength, low density cements for use at a variety of downhole temperatures, including conventional temperatures.

Surprisingly, the disclosed aluminum silicate-containing cement systems may be used in, for example, cold and/or deep-water environments, and/or in overpressured and poorly consolidated formations, to provide a cement slurry with improved thixotropic properties over conventional cements. In this regard the disclosed cement systems are typically compositions which may be used to produce cement slurries that have properties that resist fluid flow from a formation or other source, especially under conditions of cold temperature and/or high pressure differential. In particular, embodiments of the disclosed aluminum silicate-containing systems may be used to formulate cement slurries that offer improved strength development versus time, shortened transition time, and increased compressive strength versus time so as to resist or substantially prevent fluid intrusion, such as influx of gas and/or water, during or after cement curing. Further advantages include reduction in loss of cement filtrate to permeable formations during cement curing. The disclosed method and compositions are also advantageously employed in cold weather or arctic environments to provide a cement with a shortened transition time for improved compressive strength prior to freezing.

Figure 3:
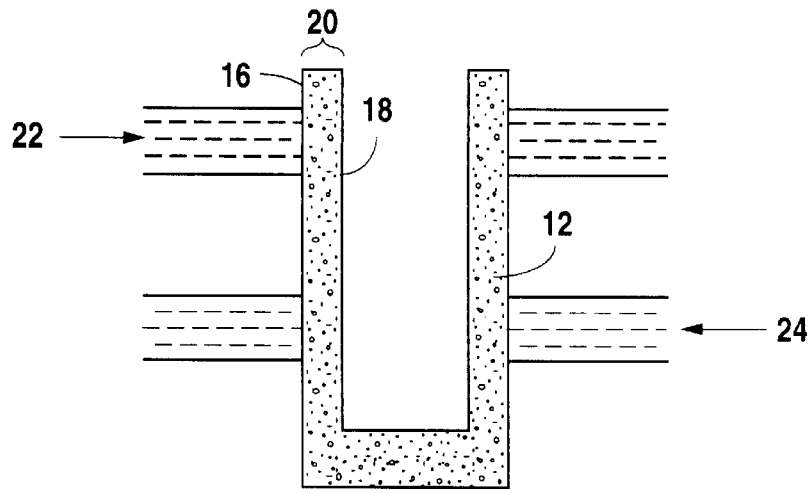
FIG. 3 is a simplified cross-sectional view of a casing string surrounded by cement and suspended in a wellbore having exposed low and high pressure formations.

The disclosed aluminum silicate-containing cement systems also may be used in wellbores susceptible to gas influx, during or after cement curing. In this regard, influx of gas during cement curing may be substantially reduced, resisted or prevented, including gas influx from zones having high pressure relative to the hydrostatic weight of a cement slurry and/or relative to other zones exposed in a wellbore, as illustrated in FIG. 3. In FIG. 3, a wellbore 16 is illustrated with a casing string 18 suspended therein. A cement slurry 12 is shown disposed in annulus 20 created between casing string 18 and wellbore 16. Gas-containing high pressure zone 22 and low pressure zone 24 are shown exposed in wellbore 16.

In one example, high pressure zone 22 may have a relatively high reservoir or formation pressure, such as about 500 psi, while low pressure zone 24 may have a relatively low reservoir or formation pressure of about 300 psi. Cement slurry 12 may initially have a pressure gradient sufficient to counterbalance both zones 22 and 24, for example to exert about 800 psi at high pressure zone 22 and about 1000 psi at low pressure zone 24. Thus, the hydrostatic pressure exerted by cement slurry 12 is sufficient to keep gas intrusion from occurring while cement slurry 12 is still fluid. However, during chemical hydration of slurry 12 and/or dehydration across a permeable zone (especially a relatively low pressure zone such as zone 24), the cement pore pressure may decrease below the formation pressure of, for example, high pressure zone 22, allowing gas from zone 22 to enter wellbore 16. This would occur, for example, if the pressure exerted by slurry 12 at zone 22 dropped below about 500 psi. Such an unbalanced wellbore pressure at zone 22 and resulting gas entry into wellbore 16 may lead to, for example, gas channeling to the surface, or to another lower pressure permeable zone.

The disclosed aluminum silicate-containing cement slurries offer improved strength development versus time, shortened transition times, and increased compressive strengths versus time. These properties reduce the opportunity for loss in hydrostatic pressure exerted by a cement slurry, and provide increased gel strength for resisting fluid intrusion (such as gas or water influx) into a wellbore from a zone exposed in the wellbore. As used herein, "fluid intrusion" includes partial or complete displacement of cement slurry by a formation fluid, fluid flow between a cement slurry and wellbore tubulars, fluid flow between a cement slurry and surrounding formation face, and/or fluid flow through the matrix of a cement slurry. In addition, reduction in loss of cement filtrate to permeable formations during cement curing helps prevent loss of hydrostatic pressure exerted against potential fluid bearing zones.

Figure 10:
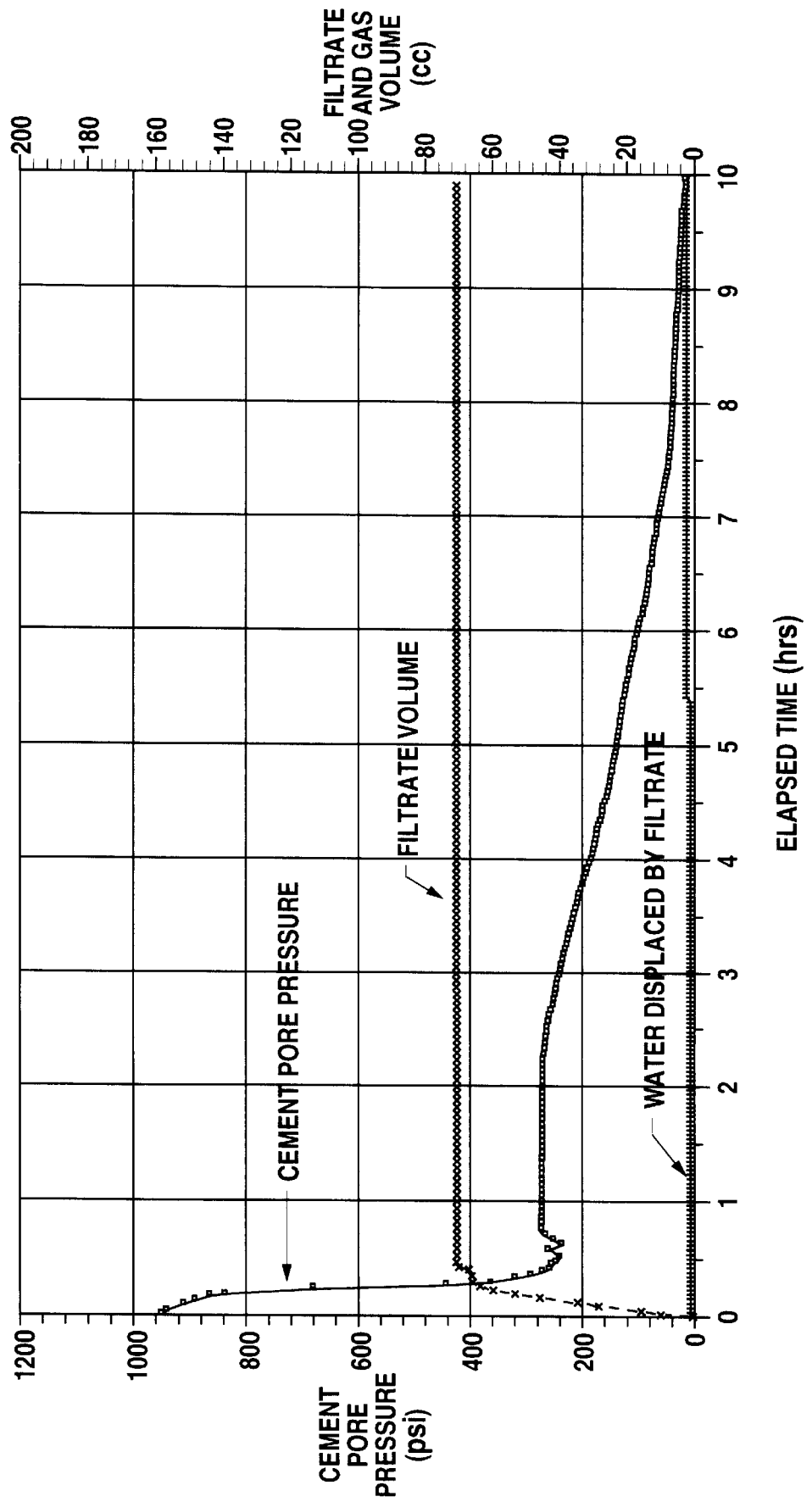
FIG. 10 shows cement pore pressure, water volume displaced by filtrate, and filtrate volume as a function of time for the aluminum silicate-containing cement slurry of Example 8.
Figure 11:
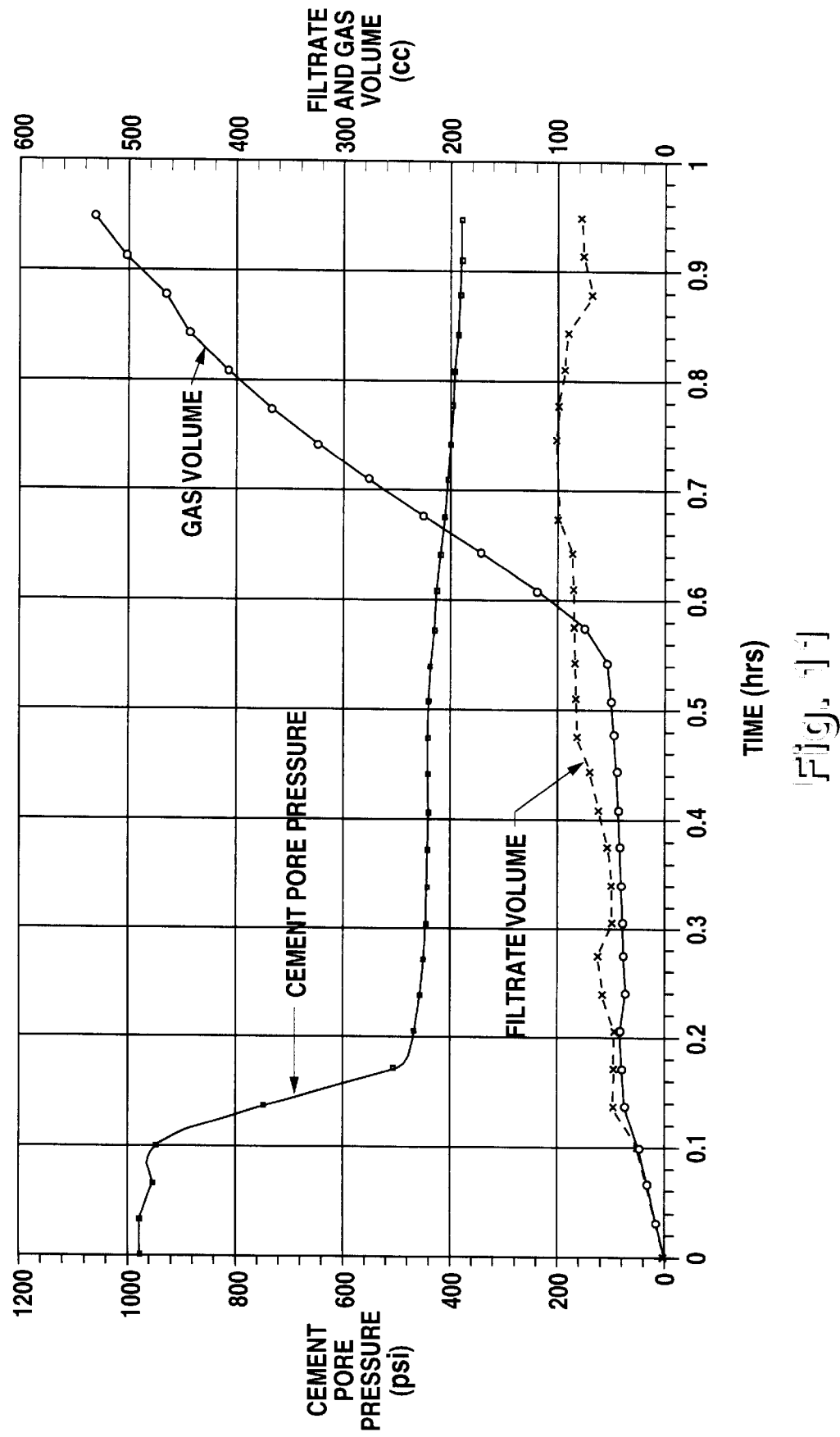
FIG. 11 shows cement pore pressure, gas volume, and filtrate volume as a function of time for the conventional cement slurry of Comparative Example A.

After curing, gas migration or migration of other fluids into the porous and permeable matrix of the cured cement may be substantially reduced, resisted, or prevented by the disclosed aluminum silicate-containing cement systems. In this regard, the disclosed cured aluminum silicate-containing cement systems may be used to produce cured hydraulic cements having reduced porosity and/or permeability as compared to comparable hydraulic cements lacking aluminum silicate. While not wishing to be bound by theory, it is believed that aluminum silicate compositions tend to react or to promote reactions within a cement slurry matrix that tend to restrict or plug interstitial areas in the cement matrix, and therefore result in reduced porosity and/or permeability of the cement. For example, an otherwise gas permeable Class G cement design may be made substantially less susceptible to gas influx and/or gas tight or substantially gas impermeable by the addition of aluminum silicate as shown in Example 8 (FIG. 10). In contrast, a similar Class G cement design containing no aluminum silicate is more susceptible to gas intrusion as shown in Comparative Example A (FIG. 11).

Comparisons between the aluminum silicate-containing cement systems of the disclosed method and conventional gypsum-containing cements may be found in Examples 1 and 2. As shown in these examples, embodiments of the disclosed aluminum silicate-containing cement offer surprising advantages over previous gypsum-containing cements, including the formation of cement slurries having shorter transition times and exhibiting a more rapid increase in gel strength and compressive strength as a function of time, thereby minimizing opportunity for water influx during curing. Embodiments of the disclosed aluminum silicate-containing cement offer considerable cost advantages over previous ultra-fine cement-based deepwater cement systems.

In one embodiment of the disclosed method and compositions, well completion and remedial cementing may be successfully performed at relatively low wellbore a temperatures such as wellbore bottomhole circulating temperatures typically less than about 60° F., and more typically less than about 50° F. At such temperatures, slurries formed from conventional cement compositions typically require unacceptably long transition or setting times and/or fail to achieve zonal isolation in an annulus formed between a pipe string and the walls of a wellbore. Such setting problems at lower temperatures may be exacerbated by formations susceptible to fluid influx, such as water sand formations or shallow gas zones below the sea floor in deepwater completions. In such deepwater completions, temperatures as low as about 30° F. may be encountered within a wellbore at the mud line. Below the mud line, temperatures may vary from about 70° F. to about 40° F., and more typically from about 60° F. to about 50° F., typically to a depth of about 4000 feet below the mud line.

When employed for cementing in wells have relatively cold downhole temperatures, one embodiment of the disclosed aluminum silicate-containing cement slurries typically has a transition time of less than about 45 minutes, and more typically less than about 40 minutes, at a temperature of about 40° F. In another embodiment, an aluminum silicate-containing cement slurry typically has a transition time of less than about 40 minutes, and more typically less than about 35 minutes, at a temperature of about 50° F. In another embodiment, an aluminum silicate-containing cement slurry typically has a transition time of less than about 30 minutes, and more typically less than about 25 minutes, at a temperature of about 60° F. In regard to the above transition time values, foamed embodiments of the disclosed cement slurries may tend to have transition times nearer the greater of the two values given above for each temperature, while unfoamed slurries may tend to have transition times nearer the lesser of the two values. In still another embodiment, an aluminum silicate-containing cement slurry typically has a transition time of between about 25 and about 45 minutes at temperatures between about 40° F. and about 60° F. Advantageously, these transition times are typically much shorter than transition times for conventional cement slurries, which are typically greater than about 45 minutes at a temperature of about 50° F. In another embodiment, an aluminum silicate-containing slurry has a typical pump time of about 3 to about 4 hours at about 50° F., and in another embodiment typically develops a compressive strength of about 50 psi or more in about 9 hours at a temperature as low as about 50° F.

In embodiments of the disclosed method, aluminum silicate may be combined with a suitable hydraulic cement or mixture of hydraulic cements and an aqueous base fluid to form a cementing slurry. In this regard, any hydraulic cement or mixture of hydraulic cements suitable for wellbore cementing and compatible with aluminum silicate may be employed. Typically, hydraulic cement type is selected based on downhole conditions, such as temperature, using methods known in the art. Examples of suitable hydraulic cement types, which may be used alone or in mixtures, include Portland cements, and more particularly ASTM Type I, II, III, IV and/or V Portland cements, and API Class A, B, C, G and/or H Portland cements. However, it will be understood with benefit of this disclosure that other cements and cements containing other additives may also be suitably employed, including those described elsewhere herein. In this regard, a suitable hydraulic cement type or mixture of hydraulic cement types may be selected based on anticipated cementing conditions with the benefit of this disclosure using methods known in the art. It will also be understood that aluminum silicate may be mixed or otherwise combined with a hydraulic cement, water, and/or other desired additives in any order suitable for forming an aluminum silicate-containing cement slurry. A suitable hydraulic cement may be mixed with various admixtures including, but not limited to, pozzolan, blast furnace sung, hollow microspheres, nitrogen, and mixtures thereof.

When utilized for cementing in a relatively cold environments, such as those described above for cementing conductor pipes in deepwater wells or in Arctic environments, any hydraulic cement suitable for cementing under these conditions may be employed, although a relatively reactive cement such as an ASTM Type I cement or API Class "A" or "C" cement, is typically employed. Most typically, API Class C cement is employed. When utilized for cementing in wellbores having relatively conventional temperatures (typically about 60° F. or greater), such as wellbores susceptible to fluid influx or displacement, or in wellbores susceptible to fluid migration (typically gas migration) through a gelled cement matrix, such as those previously described, any of the above described hydraulic cements may be employed. It will also be understood with the benefit of the disclosure that any of the hydraulic cements described elsewhere herein may be employed alone or in mixtures in wellbores subject to gas influx or in deepwater or cold environments.

In the practice of one embodiment of the disclosed method an aluminum silicate-containing cement slurry typically contains a mixture of aluminum silicate and a suitable hydraulic cement such as described elsewhere herein. In this regard, any aluminum silicate composition suitable for mixture with a hydraulic cement, and more typically, suitable for decreasing the transition time and increasing gel and compressive strength development of a hydraulic cement slurry during curing, may be employed. In one typical embodiment, aluminum silicate is typically comprised of $SiO_2/Al_2O_3/Fe_2O_3$. Most typically an aluminum silicate is kaolin or kaolinite, calcined kaolin or kaolinite (metakaolin), or mixtures thereof. Such aluminum silicate may also be referred to as China Clay. Other suitable forms of aluminum silicate include, but are not limited to, halloysite, dickite, and nacrite, and mixtures thereof, as well as mixtures of these with materials with kaolin and/or metakaolin.

Further information on suitable aluminum silicates may be found in "*Textbook of Lithology*" by Jackson, K. C., 1970, McGraw-Hill, Library of Congress No. 72-95810, which is incorporated herein by reference. As explained in this reference, in one embodiment kaolins structurally may consist of a sheet of silicon-oxygen tetrahedra coordinated with a sheet of aluminum-oxygen-hydroxide octahedra. The resultant double sheet is typically electrostatically neutral so that no additional ions are required. The various minerals of the group may differ in the stacking patterns of these double sheets.

In the practice of the disclosed method, the ratio of silica to alumina in the employed aluminum silicate is typically between about 65 and about 35, and more typically between about 52 and about 48, although other ratios are possible, including those greater than about 65 and those less than about 35. Aluminum silicates may contain trace amounts of ferric oxide. In this regard, any ferric oxide fraction present is typically present in an amount less than about 1% by weight of aluminum silicate, although fractions greater than about 1% are also possible.

In the practice of the various embodiments of the disclosed method, any amount of aluminum silicate suitable for achieving the benefits of the disclosed cement slurries described herein may be employed. Typically an aluminum silicate-containing cement for cementing in deepwater and/or cold environments, and/or for cementing in wells susceptible to fluid intrusion, comprises from about 1% to about 75%, more typically from about 1% to about 50%, more typically from about 1% to about 25%, and most typically from about 4% to about 8% aluminum silicate by weight of base cement ("BWOC"). More typically, such an aluminum silicate-containing cement comprises greater than 5% aluminum silicate, more typically from greater than 5% to about 75%, more typically from greater than 5% to about 50%, more typically from greater than 5% to about 25%, more typically from greater than 5% to about 15%, and most typically from greater than 5% to about 8% aluminum silicate by weight of base cement ("BWOC"). It will also be understood with benefit of this disclosure that other embodiments of aluminum silicate-containing cement may comprise greater than about 75% aluminum silicate.

Typically, in the practice of the disclosed method, aluminum silicate has a particle size of between about 0.5 $\mu$M and about 2 $\mu$M and a specific gravity of greater than or equal to 2.2, and most typically about 2.5. In this regard, smaller or more fine particles of aluminum silicate may be useful in situations requiring greater reactivity.

In the formulation and use of the various cement composition embodiments disclosed herein, any type of aluminum silicate suitable for obtaining the desired properties of each embodiment under individual well conditions may be employed. Typically, the disclosed aluminum silicate-containing cement slurries are formed using aluminum silicate in the form of kaolin or calcined anhydrous kaolin (metakaolin), and most typically in the form of metakaolin. Such metakaolin aluminum silicates include, but are not limited to, those commercially available as "METAMAX" and, in finer form, as "METAMAX EF", both available from Engelhard Corporation, Specialty Minerals and Colors of Iselin, N.J. "METAMAX" may be characterized as calcined anhydrous Kaolin $Al_2O_3.SiO_2$, and has an average particle size of about 1.5 $\mu$M, is composed of 97% $SiO_2+Al_2O_3+Fe_2O_3$, has a 97% Na minimum with a specific gravity of about 2.5, a maximum wet screen residue of about 0.35% at +325 mesh, a pH of about 4.5–6.5, a maximum free moisture content of about 1.0, a loose bulk density of about 18 lbs/ft$^3$, a tamped bulk density of about 32 lbs/ft$^3$, and a specific gravity of about 2.5. In comparison, "METAMAX EF" has an average particle size of about 0.5 $\mu$M, is composed of 98% $SiO_2+Al_2O_3+Fe_2O_3$, and has a specific gravity of about 2.5, with a similar pH and free moisture content as "METAMAX." It will be understood with benefit of this disclosure that "METAMAX" and "METAMAX EF" are merely given as specific examples of suitable aluminum silicates, and that other aluminum silicates may be employed as well.

Metakaolins such as "METAMAX" and "METAMAX EF" may be employed interchangeably or in mixtures under a wide variety of well cementing conditions. However, "METAMAX EF" may be optionally selected for use under conditions where greater reactivity is desired, such as under relatively colder conditions (especially cold deepwater and arctic conditions), and "METAMAX" may be optionally selected for use under conditions where reactivity is not as great of a concern, such as under relatively warmer conditions. In this regard, selection of desired aluminum silicate form may be made with the benefit of this disclosure to obtain desired cement and cement slurry properties.

In one embodiment, cement slurries including a metakaolin such as "METAMAX" may be employed for cementing deepwater wells located in areas having a seafloor temperature of greater than or equal to about 40° F., while cement slurries including a metakaolin such as "METAMAX EF" may be used in well cementing applications for cementing deepwater wells located in areas having a seafloor temperature of less than about 40° F. However, it will be understood with benefit of this disclosure that "METAMAX" may be employed for cementing deepwater wells located in areas having a seafloor temperature less than about 40° F., and "METAMAX EF" may be employed for cementing deepwater wells located in areas having a seafloor temperature greater than or equal to about 40° F.

For cementing in wells having conventional downhole temperatures (e.g., bottomhole circulating temperatures of greater than or equal to about 60° F.), aluminum silicate-containing cement slurries are typically formed using metakaolins such as "METAMAX," although any other suitable aluminum silicate as described elsewhere herein, including those such as "METAMAX EF," may be employed. Such embodiments include cementing operations in which it is desirable to control fluid intrusion in wells having conventional downhole temperatures (for example, control of gas and/or water influx and associated displacement of curing cement, or gas invasion into the permeable matrix of a cured cement).

However, it will be understood with the benefit of the disclosure that any suitable aluminum silicates including, but not limited to, the aluminum silicate compositions mentioned herein, as well as mixtures of any suitable aluminum silicate compositions, may be employed in any given situation. Examples of other suitable aluminum silicates include, but are not limited to, halloysite, dickite, and nacrite.

In the practice of the disclosed method, an aluminum silicate composition is typically mixed with hydraulic cement to form an aluminum silicate-containing cement system or composition. To form an aluminum silicate-containing cement slurry, an aluminum silicate-containing cement system is typically mixed with fresh water, but may also be mixed with sea water or any other suitable aqueous-based fluid including but not limited to formation brine, KCl water, NaCl water, sea water, drill water, drilling mud or mixtures thereof. However, it will be understood with benefit of the present disclosure that one or more aluminum silicates may be added at any point in a cement slurry mixing process, including after a hydraulic cement has been mixed with an aqueous based fluid, and/or optionally mixed with an aqueous base fluid prior to mixing with a hydraulic cement.

The water requirement of a cement slurry may be varied to achieve desired density and pumpability. In this regard any amount of water suitable for forming an aluminum silicate-containing cement slurry suitable for placement in a wellbore may be employed. In one typical embodiment for controlling shallow water influx in a deepwater well, an ultimate cement slurry contains greater than about 40% sea water BWOC, and more typically from about 50% to about 60% sea water BWOC, depending on desired pumpability. However, amounts of sea water less than about 40% are also possible. In this embodiment, an aluminum silicate-containing-cement slurry typically has a relative density of about 1.82 g/cm$^3$ (15.2 lbm/gal) and may be formulated with a slurry density of about 1.2 g/cm$^3$ (10 lbm/gal) with a fresh/sea water requirement of about 325% BWOC. However, it is possible to vary the slurry density, for example, to about 2.2 g/cm$^3$ (19 lbm/gal) with a fresh/sea water requirement of about 22% BWOC. Furthermore, weighting additives such as hematite may be used to increase density to, for example, about 2.2 g/cm$^3$ (19 lbm/gal) using lesser amounts of water.

When used in embodiments of the disclosed method, a typical cement slurry density of between about 10 lbm/gal to about 19 lbm/gal, most typically between about 16.0 lbm/gal and about 15.0 lbm/gal, is employed, including less than 10 lbm/gal or greater than 19 lbm/gal. However, any other slurry density suitable for use in a wellbore may be employed. The system may also be foamed with nitrogen gas or other suitable energizing phase to achieve lower densities, for example, to obtain densities as low as about 0.96 g/cm$^3$ (8 lbm/gal).

In one embodiment, one or more additives suitable for further decreasing transition time may optionally be employed. Examples of such additives include gypsum, calcium chloride, sodium silicate, metasilicate, or mixtures thereof. As a particular example, an aluminum silicate-containing cement may include between about 1% and about 15%, and more typically between about 1% and about 10% gypsum BWOC, such as "A-10" gypsum available from BJ Services. However, amounts greater than about 15% gypsum BWOC and less than about 1% gypsum BWOC are also possible.

In embodiments of the disclosed methods and compositions, other additives, including any suitable cementing additives known to those of skill in the art may be employed in the formulation of an aluminum silicate-containing cement slurry. Optional additives may be used, for example, to further vary characteristics of an aluminum silicate-containing cement slurry, including to further vary viscosity, further control fluid loss, further immobilize water between particles, to further impart variable thixotropic properties to a cement slurry, etc. Examples of typical additives include, but are not limited to, accelerators, dispersants, viscosifiers, fluid loss control agents, set retarders, low density additives, weighting agents, thinners, foamers, lost circulation materials, energizing gases (such as nitrogen gas, air, etc.). Thus, an aluminum silicate-containing cement slurry may be formulated for a given situation to provide a reduced transition time while at the same time providing a density compatible with formation pressure gradients in order to avoid cement loss to the formation. For example, embodiments of the disclosed aluminum silicate-containing cement slurries typically may include greater amounts of accelerator additives for use in relatively cold downhole environments, and lesser amounts of such additives for use at relatively higher downhole temperature.

In embodiments of the disclosed method directed toward controlling fluid influx and, in particular, gas influx (including in wells with conventional wellbore bottomhole circulating temperatures of about 60° F. and above) an aluminum silicate-containing cement slurry typically comprises a range of aluminum silicate amount in relation to hydraulic cement as previously described herein, and may be varied with benefit of this disclosure depending on the desired slurry density. However, when particular susceptibility to gas intrusion is suspected, the amount of aluminum silicate in an aluminum silicate-containing cement composition may be selected to be from about 8% to about 12% BWOC. As in all embodiments of the disclosed method and compositions, hydraulic cement type may be selected based on downhole conditions, such as temperature, using methods known in the art with benefit of this disclosure.

Typically a slurry embodiment for controlling fluid influx also includes optional cement fluid loss control additives, especially when low pressure or "thief" zones such as illustrated in FIG. 3 are suspected to be present. Typical fluid loss control additives include, but are not limited to, materials such as hydroxyethyl cellulose ("HEC"), HEC blends, carboxymethyl hydroxyethyl cellulose ("CMHEC"), CMHEC blends, polyethylene imine ("PEI"), copolymers of acrylamide and acrylic acid, polyvinyl alcohol ("PVA"), PVA blends, etc. Such fluid loss control additives are typically employed in an amount of from about 0.1% to about 3%, more typically from about 0.1% to about 2%, and most typically in an amount of from about 0.1% to about 1.5% BWOC, although other amounts such as amounts greater than about 3% BWOC are also possible. Other additives as described elsewhere herein may also be optionally employed. In one embodiment, the above described fluid influx control embodiment is employed to control fluid influx and, most typically, gas influx in wellbores having bottomhole circulating temperatures of greater than or equal to about 60° F., and more typically between about 70° F. and about 400° F., although benefits of such an embodiment may be realized at temperatures less than about 60° F. or greater than about 400° F. as well.

Any additive/s suitable for controlling fluid flow may also be optionally employed including, but not limited to, polyvinyl alcohol-based anti-fluid flow additives. For example, in one embodiment a polyvinyl alcohol fluid flow additive (such as "BA-10" available from BJ Services) is typically used in an amount of between about 0.1% and about 3.0%, more typically from about 0.1% to about 1.5% BWOC, although other amounts are possible.

Fluid loss control additives may also be optionally used. Such additives include any additive suitable for controlling fluid loss from an aluminum silicate-containing cement slurry prior to setting. Examples of such additives include HEC, CMHEC, 2-acrylomido, 2-methyl propane sulfonic acid, ("AMPS") copolymers, or mixtures thereof. In one typical embodiment, between about 0.1% and about 3.0%, and more typically from about 0.1% to about 1.5% of "FL-33" fluid loss control additive BWOC (available from BJ Services) is employed, although other amounts are also possible.

Accelerators may also be optionally employed. In this regard, any additive/s suitable for well cementing may be used including, but not limited to, calcium chloride potassium chloride, sodium chloride, NaCl, seawater, sodium silicate, sodium metasilicate, or mixtures thereof. In one typical embodiment, between about 0.1% and about 4%, more typically from about 0.1% to about 2% of "A-7" calcium chloride BWOC (available from BJ Services) may be employed in formulating a slurry, although other amounts are possible. In addition to acting as an accelerator, calcium chloride may also serve as a freezing point depressant to lower the freezing point of water within a cement slurry, in some cases preventing freezing of a slurry during mixing and curing. This may be advantageous when cementing operations are performed in very cold environments, further enabling the disclosed aluminum silicate-containing cement slurries to develop sufficient compressive strengths without freezing.

Any dispersant additive/s suitable for facilitating the mixing of wet and dry materials in a slurry and/or activating dry materials may also be used including, but not limited to, dispersants such as naphthalene sulfonate, ethoxylated napthalene sulfonate or ketone-acetone sulfonate. Such additives may be particularly useful, for example, when lower water to cement ratios are employed. In one typical embodiment, between about 0.1% and about 3%, more typically from about 0.1% to about 1.0% of ketone-acetone sulfonate, ethoxylated napthalene sulfonate, or naphthalene sulfonate (such as "CD-33," "CD-32" or "CD-31", respectively, available from BJ Services) BWOC is used, although other amounts are possible.

Low density additives may also be optionally employed. In this regard, any additives suitable for lowering slurry density may be used including, but not limited to, sodium silicate, sodium metasilicate, hollow microspheres, or mixtures thereof. In one typical embodiment, between about 1% and about 75%, more typically from about 1% to about 50% of a lightweight additive such as hollow ceramic microspheres available as "LW-6" BWOC (available from BJ Services) may be employed in formulating a slurry, although other amounts are possible.

Set retarders may also be optionally used. Any set retarder composition suitable for retarding or otherwise delaying the setting of an aluminum silicate-containing cement, such as for increasing pumping time of a cement slurry, may be used. Examples include, but are not limited to lignosulfonates, sugars, phosphonates, or mixtures thereof. In one typical embodiment, between about 0.1% and about 3%, more typically from about 0.1% to about 1.0% of a sodium lignosulfonate cement retarder "R-3" BWOC (available from BJ Services) may be employed as a set retarder, although other amounts are possible.

By using additives in combination with aluminum silicate and hydraulic cement, aluminum silicate-containing cement slurries may be formulated to possess desired characteristics, such as high early compressive strength, to fit particular applications at specific temperatures or ranges of temperatures, if so desired. In this regard, suitable additives include, but are not limited to, one or more of those additives mentioned elsewhere herein. For example, in one most typical embodiment, an aluminum silicate-containing cement slurry comprises between about 30% and about 100% by weight of one cubic foot of hydraulic cement and from about 1 to about 40% of aluminum silicate BWOC. In this embodiment, the aluminum silicate-containing cement slurry possesses a transition time of between about 30 minutes to about 35 minutes, and a high early compressive strength range of between about 50 psi to about 100 psi in less than about 10 hours, both measured at a temperature of from about 45° F. to about 55° F.

In another embodiment of the disclosed method, aluminum silicate may be used as a pozzolan replacement or extender in the formulation of high strength, low density cements, such as may be used desired when cementing wellbores penetrating low pressure formations and/or formations susceptible to formation damage. In this regard, any amount of aluminum silicate suitable for imparting increased strength to a relatively low density cement may be employed, including those aluminum silicate content ranges described elsewhere herein. However, surprisingly good results are obtained using aluminum silicate-containing cement compositions comprising amounts of aluminum silicate greater than 10% BWOC. For example, from about 15% to about 60%, and most typically about 35% of aluminum silicate BWOC may be employed to impart surprisingly improved compressive strengths for low density cements. Amounts of aluminum silicate less than about 10% BWOC and greater than about 60% BWOC may also be employed. Advantageously, this embodiment of the disclosed method provides cement compositions giving higher strengths at any given density over cement compositions employing conventional extenders, such as pozzolan (fly ash) and/or bentonite.

Typically, the disclosed aluminum silicate-containing high strength, low density cements are formulated to have a slurry density of between about 11.5 lbm/gal and about 13.5 lbm/gal, although densities less than about 11.5 lbm/gal and greater than about 13.5 lbm/gal are also possible. Examples of such cement formulations and their characteristics are given in Example 8 and Tables 5 and 6. In formulating such high strength, low density cements, other extenders may also be present in a cement composition or slurry including, but not limited to, pozzolan (e.g., Class C fly ash, Cass F fly ash, etc.) and/or bentonite. Other advantages offered by the disclosed high strength, low density aluminum silicate-containing cements of this embodiment include reduced cost where sufficient viscosity may be obtained with reduced amounts or elimination of bentonite. Furthermore, when used as a pozzolan replacement, aluminum silicate may be added to a cement slurry after mixing, eliminating the need for extender pre-blending prior to adding water as typically required, for example, when pozzolan extenders are employed. This capability may be particularly advantageous, for example, for cementing operations performed in remote locations where blending facilities are not available or easily accessible. It will be understood with benefit of this disclosure that any of the aluminum silicate materials, cements and optional additives described elsewhere herein may be employed to mix or formulate high strength, low density cement slurries for cementing wellbores using any suitable operational methods known in the art, including cementing at conventional and non-conventional temperatures, and in remedial or workover situations.

It will be understood with the benefit of this disclosure that a cement slurry may also contain other conventional additives including but not limited to additives for controlling free water or solid separation, silica fume, glass or ceramic microspheres, perlite, etc.

When so desired, a cement slurry may be foamed utilizing a foaming agent, optional stabilizer, and an energizing phase. In this regard, any foaming agent and/or stabilizer suitable for creating a stable foamed aluminum silicate-containing cement may be employed in any amount suitable for obtaining a foamed cement slurry. In the case of salt water based cement slurries, a foaming agent typically includes, but is not limited to, oxyalkylated sulfates or ethoxylated alcohol sulfates, or mixtures thereof. Most typically "FAW-20" ethoxylated alcohol sulfate foaming agent available from BJ Services is utilized. Suitable salt water stabilizers include, but are not limited to, polyvinyl alcohol, sodium silicate, or mixtures thereof. Most typically, a polyvinyl alcohol stabilizer known as "BA-10" and available from BJ Services is used. In the case of fresh water based cement slurries, a foaming agent typically includes, but is not limited to, oxyalkylated sulfates or ethoxylated alcohol sulfates, or mixtures thereof. Most typically "FAW-20" foaming agent available from BJ Services is utilized. Suitable fresh water stabilizers include, but are not limited to, polyvinyl alcohol or sodium silicate, or mixtures thereof. Most typically, "BA-10" stabilizer available from BJ Services is used.

Any energizing phase composition suitable for forming a foamed aluminum silicate-containing cement may be employed including but not limited to gaseous material such as carbon dioxide, nitrogen, liquid petroleum gases (such as liquefied natural gas and liquefied petroleum gas, etc.), or a mixture thereof. An energizing phase is typically added to a mixture of cement, aqueous fluid, surfactant and stabilizer. The slurry density may be controlled with benefit of this disclosure by adjusting the amount of energizing phase added to an unfoamed cement slurry. For example, in one embodiment the density of an aluminum silicate-containing cement slurry may be adjusted from about 8 to about 15 lbs/gal by adding from about 1500 to about 25 standard cubic feet (SCF) of nitrogen gas at standard conditions per barrel (bbl) of unfoamed cement slurry, although any other amounts suitable for obtaining a foamed cement slurry are possible.

One or more defoaming additives may also be optionally used with aluminum silicate-containing foamed cement slurries to prevent foaming during mixing and pumping of a foamed slurry. In this regard, any defoaming additive suitable for cementing operations may be employed including, but not limited to, glycol, alcohols or silicones, or mixtures thereof. Most typically "FP-12L" defoaming additive available from BJ Services is employed in an amount of from about 0.01 to about 0.5 gallons per sack ("GPS") concentration, most typically from about 0.05 to about 0.1 GPS concentration, although other amounts are possible.

In either salt water or fresh water based cement slurries, any suitable energizing phase, including but not limited to nitrogen, $CO_2$, air or mixtures thereof may be employed in a sufficient amount to achieve the desired density of cement, typically in an amount of between about 10 SCF/bbl and about 2000 SCF/bbl at standard conditions, most typically between about 100 SCF/bbl to about 1000 SCF/bbl, although other amounts are possible. Most typically nitrogen is employed.

In one most typical foamed salt water based cement embodiment, nitrogen is employed with a cement composition comprising between about 40 and about 100% of ASTM Type 1 cement and from about 4 to about 6 of "METAMAX" aluminum silicate, in combination with "CD-33" ketone/acetone formaldehyde condensates, "BA-10" polyvinyl alcohol, "A-7" calcium chloride, and "A-2" sodium metasilicate (with "CD-33,", "BA-10," "A-7," and "A-2" being available from BJ Services). In this embodiment from about 0.01 GPS to about 0.5 GPS, more typically from about 0.05 GPS to about 0.16 GPS of "FAW-20" foaming agent is employed with nitrogen in an amount of between about 50 SCF/bbl and about 2000 SCF/bbl, most typically between about 100 SCF/bbl to about 1000 SCF/bbl so as to achieve a foamed cement slurry having a density of between about 8 and about 15 lbm/gal, and more typically between about 9 and about 13 lbm/gal, although other nitrogen amounts and densities are possible. A polyvinyl alcohol stabilizer is also typically employed in an amount of from about 0.1 to about 1.5, more typically from about 0.2 to about 0.8.

In one most typical fresh water based foamed cement embodiment, the same types and amounts of nitrogen energizing phase, cement, aluminum silicate, and other additives described for a salt water based cement slurry are employed with a ethoxylated alcohol sulfate foaming agent and a polyvinyl alcohol stabilizer. In this fresh water embodiment, the ethoxylated alcohol sulfate foaming agent is typically present in an amount of from about 0.01 GPS to about 0.5 GPS, more typically from about 0.05 GPS to about 0.10 GPS, and the polyvinyl alcohol stabilizer present in an amount of from about 0.1 to about 1.5, more typically from about 0.2 to about 0.8, so as to achieve a foamed cement slurry having a density of between about 8 and about 15 lbm/gal, and more typically between about 9 and about 13 lbm/gal, although other nitrogen amounts and densities are possible.

When a foam cement slurry is employed to cement a conductor pipe in a deepwater completion, the density of the foam cement slurry is typically maintained so that the fracturing gradient of the near-surface formation surrounding the conductor pipe is not exceeded. In this regard, the slurry density may be adjusted to be slightly above the formation pressure but below the fracturing pressure so as to prevent fluid influx during the cement transition time while at the same time maintaining control over the slurry. In this regard, a density of a foam cement slurry is typically adjusted to be from about 1 to about 3 lbm/gal above a density needed to equalize the formation pressure, although other densities may be used as desired.

Embodiments of the disclosed method and compositions offer, among other things, cement slurries having the characteristic of developing sufficient gel strength to resist or prevent influx of formation fluids during the transition time when the slurry is static after placement in a wellbore. In this regard, the most typical non-foamed embodiment of the disclosed aluminum silicate-containing cement slurry described above develops a gel strength or yield point of greater than about 500 lbf/100 ft$^2$ within about 30 minutes of time of placement, thus reducing or substantially preventing fluid migration into a cement sheath from formations surrounding the wellbore. Other characteristics of the most typical unfoamed cement embodiment includes pump times at 50° F. of about 4–5 hours, transition times of about 35 minutes or less, API fluid loss of less than about 30 cubic centimeters (cc) fluid loss in 30 minutes, good compressive strength development at relatively short periods of time at temperatures of less than about 50° F., and little or no free water development.

Likewise, the most typical foamed cement slurries embodiments described above develop a gel strength or yield point of greater than about 500 lbf/100 ft$^2$ within about 35 minutes of time of placement, similarly reducing or substantially preventing fluid influx into the cement from the formation surrounding the wellbore. Other characteristics of the most typical foamed cement embodiment includes relatively low densities, pump times at 50° F. of about 4 to about 5 hours, transition times of about 35 minutes or less, API fluid loss of less than about 30 cc fluid loss in 30 minutes, good compressive strength development at relatively short periods of time at temperatures of less than about 50° F., and little or no free water development.

To further illustrate these and other advantages of the disclosed aluminum silicate-containing cement systems, Examples 1 and 2 are provided comparing both foamed and unfoamed embodiments of slurries formed using the disclosed aluminum silicate-containing cement systems with conventional foamed and unfoamed cement slurries, respectively. As indicated by the results of these examples, embodiments of the disclosed cementing system may be typically well suited for, amount other things, use as shallow water flow inhibiting "tail" slurries, as well as for use base cements which may be nitrified to produce lightweight "filler" slurries.

In a most typical embodiment, a foamed or unfoamed cement slurry of hydraulic cement and aluminum silicate as described herein is utilized to cement a conductor pipe in a deepwater well completion. In such a completion, a conductor pipe is typically positioned or placed in a wellbore drilled through a surface pipe which has been set through the mud line. In such situations an annulus is typically formed between the outside diameter of the conductor pipe and the interior diameter of the wellbore in which cement may be placed to isolate the formations exposed at the wellbore face. In this embodiment, a foamed or unfoamed aluminum silicate-containing cement slurry is typically introduced by displacing the slurry down the interior of the conductor pipe and circulating the slurry around the end of the conductor pipe and into the wellbore conductor pipe annulus. Sufficient cement slurry is typically pumped through the conductor pipe and around and into the annulus so as to obtain cement returns at the sea floor. When pumped in this manner, the cement slurry is typically preceding by a spacer fluid of the type known to those of skill in the art which serves to displace and substantially remove drilling mud present in the wellbore prior to cementing. Once the aluminum silicate-containing cement slurry has been circulated around the bottom end of the conductor pipe, typically through the annulus to the sea floor, the cement slurry is typically maintained within the annulus and allowed sufficient time to gain gel and compressive strength. By utilizing such an aluminum silicate-containing cement slurry, influx of fluids from the surrounding formation during curing may be substantially prevented or reduced over conventional cement slurries or compositions employed for this purpose.

In one embodiment for cementing casing in a wellbore (such as cementing a conductor pipe in a deepwater well completion), a relatively lower density aluminum silicate-containing cement "lead" slurry is initially pumped down the interior of the pipe and followed by a relatively higher density aluminum silicate-containing "tail" slurry. In such a cementing application, a sufficient volume of tail slurry is typically pumped so that it may be displaced around the shoe at the end of the job, and so that it may set up in the shoe joint. In such an embodiment the volume of the lead slurry typically comprises between about 60% and about 80% of the total slurry pumped, with the tail slurry comprising the remaining volume, although the lead slurry may represent a greater or lesser percentage of the total slurry pumped. More typically, the lead slurry represents about 70% of the total slurry volume pumped, with the tail slurry representing the rest. In one embodiment, the lead slurry may be an aluminum silicate-containing nitrified cement slurry (as described elsewhere herein) having a density of from about 9 lbm/gal to about 13 lbm/gal, with the tail slurry being a non-nitrified aluminum silicate-containing cement slurry having a density of from about 15 to about 16.2 lbm/gal, although other combinations of slurry densities are possible. In a most typical embodiment the lead slurry is formulated with nitrogen and foaming agent as it is pumped, with the nitrogen and foaming agent being discontinued after a desired amount of lead slurry has been pumped, the remaining slurry being pumped as the non-foamed tail slurry.

Although typically employed to cement pipe strings at relatively shallow depths in relatively cold temperature wellbore environments, such as deepwater completions, it will be understood with benefit of this disclosure that benefits of the disclosed compositions and methods may be obtained in any wellbore environment having relatively cold temperatures as described herein. For example, the disclosed foamed and unfoamed aluminum silicate-containing cement slurries may be employed in any cementing operations performed under relatively cold down hole conditions, such as may be encountered, for example, in arctic or other similarly cold environments, to reduce or substantially prevent fluid influx during curing and/or to allow a slurry to cure to a sufficient compressive strength, for example, prior to freezing. In this regard, it will also be understood that "cementing operations" as used herein means any type of wellbore cementing application known in the art, including long string cementing, liner cementing, inflatable packer cementing, squeeze cementing, etc. Such operations include, but are not limited to, drilling, completion and remedial cementing operations, including those performed on existing completed wellbores, as well as those cementing operations performed during well abandonment operations.

Furthermore, it will be understood with benefit of this disclosure that although typical ranges and amounts of hydraulic cement, aluminum silicate, and additives are described and illustrated herein, any other amounts of these components and/or other additives may be suitably employed where the benefits of the disclosed aluminum silicate-containing cement systems may be realized as described elsewhere herein. It will also be understood that although specific typical embodiments of cementing procedures using an aluminum silicate-containing cement slurry have been described herein, an aluminum silicate-containing cement slurry may be mixed, pumped, spotted, or otherwise introduced into a wellbore and/or wellbore annulus in any manner known to those of skill in the art. Furthermore, an aluminum silicate-containing cement slurry may be formulated with benefit of this disclosure in any suitable manner known to those of skill in the art including, but not limited to, by continuous mixing, batch mixing, etc.

EXAMPLES

The following examples are illustrative and should not be construed as limiting the scope of the invention or claims thereof.

The following examples were performed using modified API cement testing equipment. The testing equipment was modified used refrigeration units capable of simulating cold temperatures, such as those found at the seafloor of deepwater offshore wells. Using this equipment, parameters such as thickening time, UCA compressive strength, fluid loss, and static gel strength transition time were measured under seafloor conditions.

Example 1

In the following example, one embodiment of an aluminum silicate-containing cement slurry was tested and compared to a conventional gypsum-containing cementing system. Characteristics of the conventional gypsum slurry (Slurry #1) and a slurry embodiment employing aluminum silicate (Slurry #2) are presented in Tables 1 and 2. Components of the slurry systems are listed in Table 1. Slurry properties, testing conditions, and compressive strength information is presented in Table 2.

TABLE 1

Slurry Component Data
(All Percentages given are BWOC)

| SLURRY #1 | SLURRY #2 |
| --- | --- |
| Holnam Type 1 Cement | Holnam Type 1 Cement |
| 5% "A-10" gypsum | 5% "METAMAX" aluminum silicate |
| 0.8% "CD-32" ethoxylated naphthalene sulfonate dispersant | 0.6% "CD-33" ketone acetone formaldehyde dispersant |
| 0.4% "BA-10" polyvinyl alcohol | 0.4% "BA-10" polyvinyl alcohol |
|  | 0.5% "A-7" calcium chloride accelerator |
|  | 0.2% "A-2" sodium metasilicate |

TABLE 2

Slurry Properties and Test Results

| Slurry Properties | Slurry #1 | Slurry #2 |
| --- | --- | --- |
| Density, ppg | 15.2 | 15.2 |
| Yield, cu.ft./sk. | 1.34 | 1.34 |
| Mixing water, gal/sk. | 6.08 | 6.06 |
| Water type: | SEA | SEA |
| Thickening Time @ 50° F. (hrs.) | 3 hrs, 3 min. | 3 hrs, 39 min. |
| Free Water @ 50° F. (mls.) | Trace | Trace |
| Fluid Loss @ 50° F. (ml/30 min) | 22 | 20 |
| Compressive Strength @ 50° F. (psi) |  |  |
| Time to 50 psi. | 9 hrs, 55 min. | 8 hrs, 51 min. |
| Time to 500 psi | 23 hrs, 47 min. | 21 hrs, 47 min. |
| Compressive Strength at 72 hrs., psi (measured @ 3000 psi curing pressure) | 2000 | 2150 |
| Slurry Rheologies (Fann Readings) |  |  |
| 300 RPM | 126 | 100 |
| 200 RPM | 102 | 82 |
| 100 RPM | 76 | 64 |
| 6 RPM | 50 | 49 |
| 3 RPM | 40 | 38 |
| 600 RPM | 192 | 154 |
| Plastic viscosity ("PV") | 66 | 54 |
| Yield Point ("YP") | 60 | 46 |
| *Transition Time ("MACS" Results @ 66° F.) | 38 min. | 32 min. |

*Transition time of cement from 100#/100 ft² gel strength to 500#/100 ft² gel strength as determined by a "MACS" analyzer, available from Halliburton.

Figure 1:
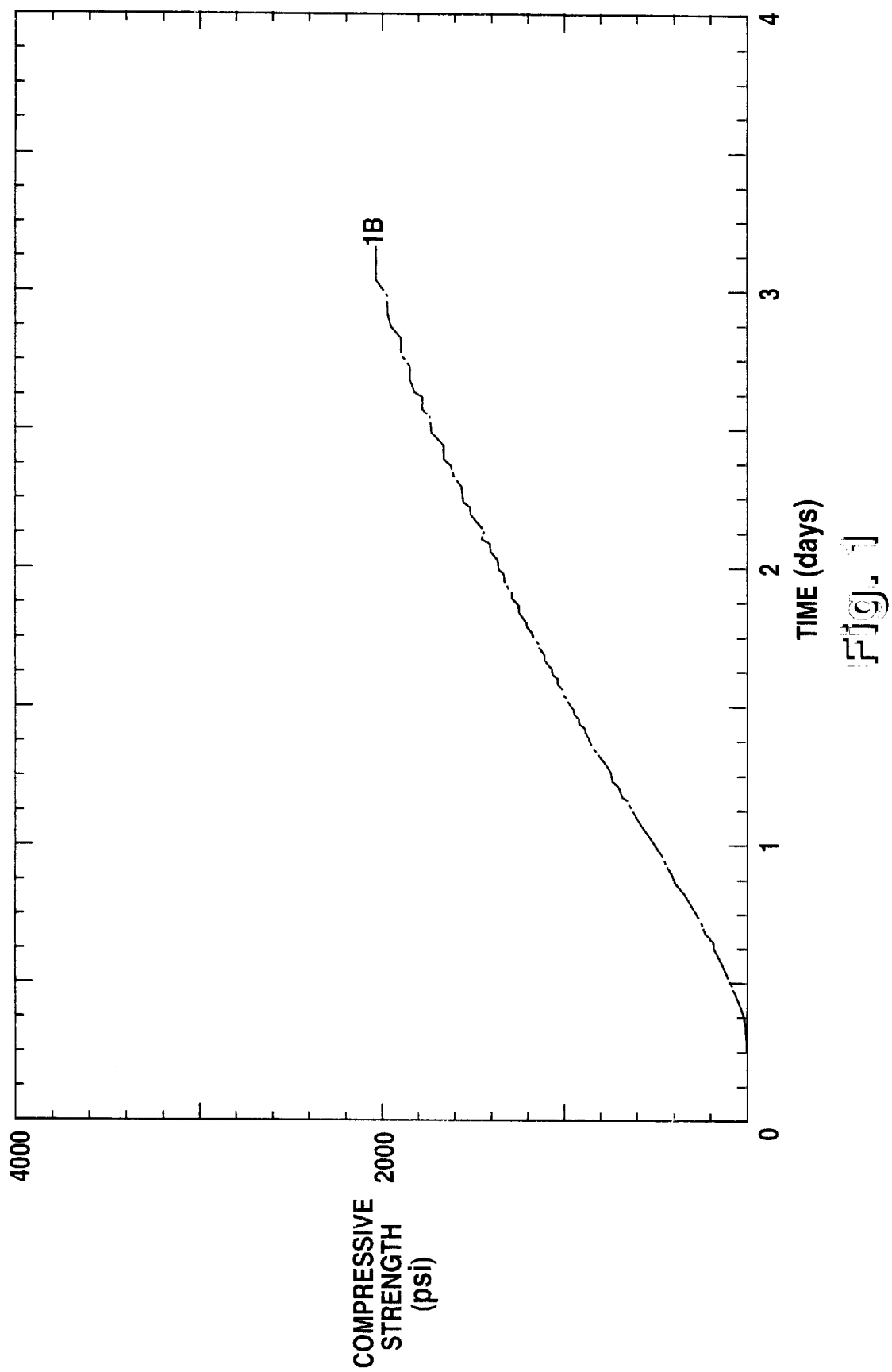
FIG. 1 shows compressive strength versus time for a conventional cement slurry.
Figure 2:
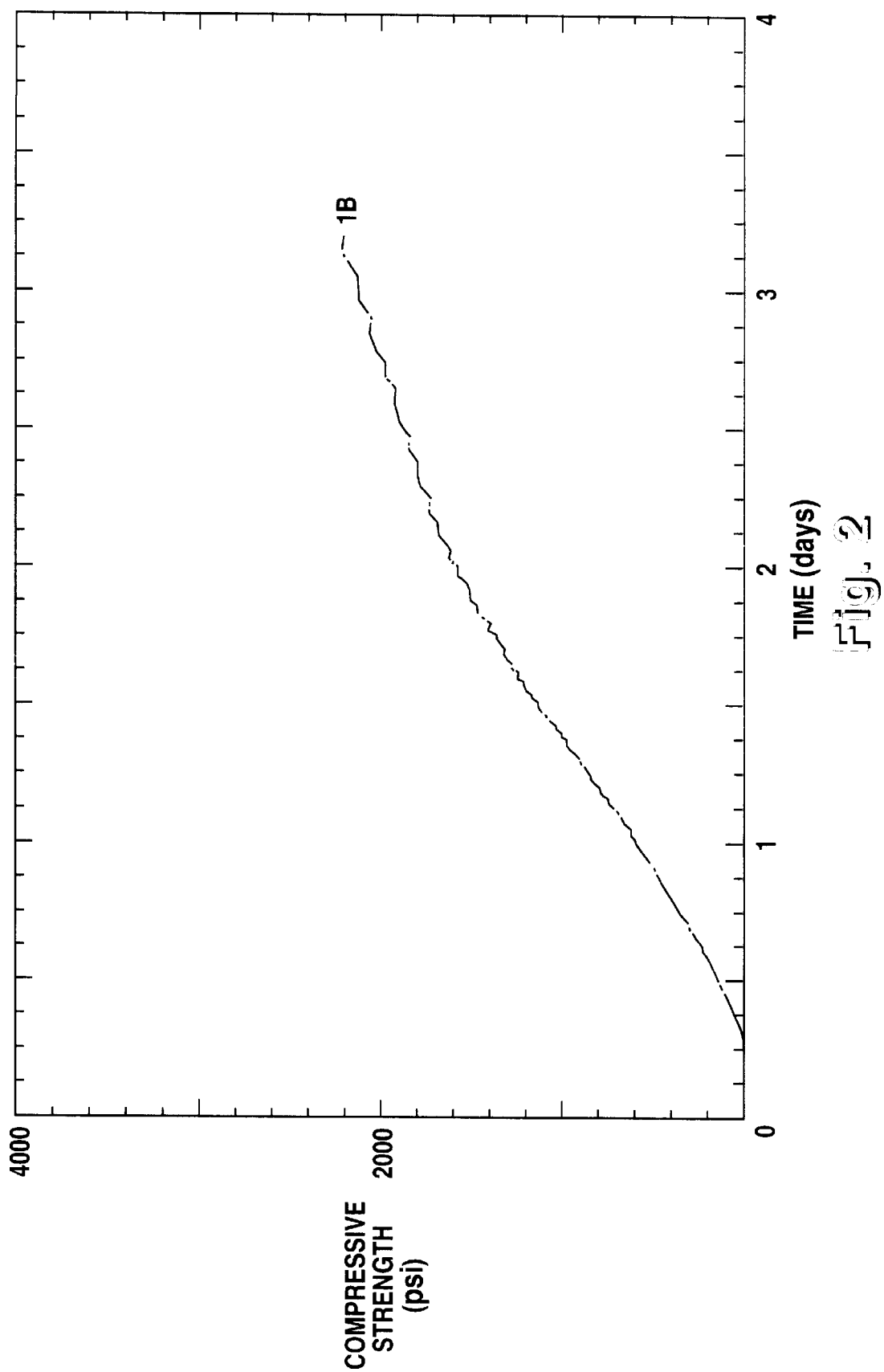
FIG. 2 shows compressive strength versus time for a cement slurry according to one embodiment of the disclosed compositions and methods.

FIG. 1 and FIG. 2 show the development of compressive strength over time (during curing) for Slurry #1 and Slurry #2, respectively. Compressive strength was measured at 3000 psi and 50° F. using an ultrasonic cement analyzer. As can be seen in Table 2, Slurry #2 which includes aluminum silicate according to one of the disclosed embodiments, and methods shows faster development of compressive strength over conventional Slurry #1 which includes gypsum. For example, Slurry #2 develops a compressive strength of approximately 1200 psi after 1.6 days as compared to approximately 1000 psi for Slurry #1, which requires approximately 1.9 days to develop a 1200 psi compressive strength. This represents an increase of about 20% in compressive strength at 1.6 days for the aluminum silicate-containing Slurry #2.

The above test results show that the disclosed aluminum silicate-containing cement compositions (Slurry #2) gives enhanced early compressive strength development compared to gypsum-containing cements (Slurry #1), while at the same time possessing a longer thickening time. Longer thickening times offer increased pumping time which may be advantageous, for example, when performing relatively large cement jobs such as cementing large shallow casing strings (e.g., 20 inch diameter or larger). Slurry #2 also exhibits a shorter transition time, as well as a shorter time to 50 psi and 500 psi compressive strengths, than does Slurry #1. Furthermore, as can be seen in Table 2 aluminum silicate-containing cement Slurry #2 has lower slurry rheologies than the gypsum-containing Slurry #1, making it easier to mix than conventional slurries.

Example 2

In Example 2, a conventional foamed cement slurry (Slurry #1) was compared to one embodiment of a foamed aluminum silicate-containing cement slurry (Slurry #2). Components of Slurry #1 and Slurry #2 are given in Table 3, and slurry properties, testing conditions, and compressive strength information are given in Table 4.

TABLE 3

Foamed Slurry Component Data
(Unless indicated otherwise, all percentages given are BWOC)

| SLURRY #1 (Foamed to 11 PPG) | SLURRY #2 (Foamed to 11 PPG) |
| --- | --- |
| Holnam Type 1 Cement | Holnam Type 1 Cement |
| 5% "A-10" gypsum | 5% "METAMAX" Aluminum Silicate |
| 0.8% "CD-32" ehtoxylated naphthalene sulfonate dispersant | 0.6% "CD-33" ketone-acetone formaldehyde condensate |
| 0.4% "BA-10" polyvinyl alcohol | 0.4% "BA-10" polyvinyl alcohol |
| 0.75% of "FAW-20" ethokylated alcohol by weight of slurry ("BWOS") sulfate foaming agent | 0.5% "A-7" Calcium chloride accelerator |
|  | 0.2% "A-2" sodium metasilicate |
|  | 0.75% "FAW-20" ethoxylated alcohol sulfate foaming agent BWOS |

TABLE 4

Foamed Slurry Properties and Test Results

| Slurry Properties | Slurry #1 | Slurry #2 |
|---|---|---|
| Unfoamed Density, ppg | 15.2 | 15.2 |
| Foamed Density, ppg | 11 | 11 |
| Yield, cu.fi./sk. | 1.34 | 1.34 |
| Mixing water, gal/sk. | 6.08 | 6.06 |
| Water type: | SEA | SEA |
| Thickening Time @& 50° F. (hrs.) | 4 hrs, 13 min. | 4 hrs, 28 min. |
| Compressive Strength at 72 hrs., psi (measured @ 3000 psi curing pressure) | 148 | 282 |
| *Transition Time ("MACS" Results @ 66° F) | 38 min. | 39 min. |

*Transition time of cement from 100#/100 ft$^2$ gel strength to 500#/100 ft$^2$ gel strength as determined by a "MACS" analyzer, available from Halliburton.

The results of Example 2 show that foamed aluminum silicate-containing cement Slurry #2 gives a 90% increase in early compressive strength development over conventional foamed cement Slurry #1 while, at the same time, offering a thickening time that is slightly greater than the thickening time of Slurry #1.

Examples 3–8

Aluminum Silicate-Containing Cements For Gas Intrusion Control

Gas flow model curves and thickening time test data were determined for embodiments of the disclosed method using cement slurries prepared for gas intrusion control.

Figure 4:
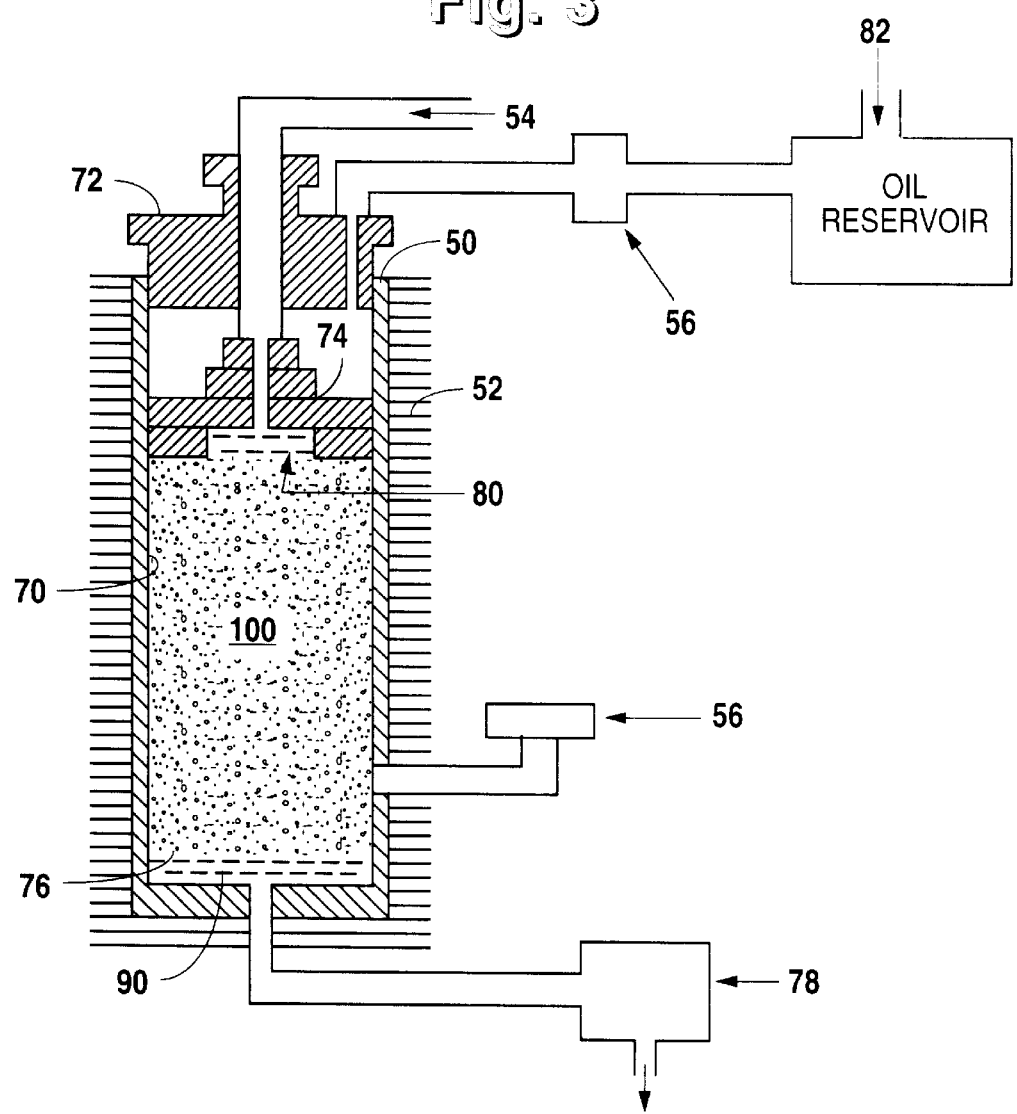
FIG. 4 is a simplified schematic of a gas flow test apparatus used in conducting Examples 3–8, and Comparative Examples A and B.

For Examples 3–8, a gas flow model was constructed to simulate a typical well configuration in which a cement slurry is exposed to its own hydrostatic pressure, a pressurized gas formation, and a lower pressure permeable zone, such as the situation illustrated in FIG. 3. A simplified schematic of the gas flow model is shown in FIG. 4. The gas flow model consisted of test cell 50, heating jacket 52, pressurized nitrogen gas source 54, pressure transducers 56, and (not shown) load cells, a linear variable differential transducer ("LVTD"), a data acquisition unit ("DAU"), and a computer. The test cell 50 consisted of test cylinder 70, top head assembly 72, floating piston 74, bottom assembly 76 and back pressure regulator 78.

For each example, the floating piston 74 was fitted with a 325 mesh stainless steel screen or core 80 (depending on the requirements of the run) and loaded into the test cylinder. Nitrogen gas pressure 54 was then applied to the screen or core 80 to simulate a gas bearing zone. The top head assembly 72 was then fitted into the top of the test cylinder 70 and hydraulic oil pressure 82 applied to the top of the piston to represent slurry hydrostatic pressure.

Next, each slurry design was mixed according to API Spec 10 and conditioned in an atmospheric or pressurized consistometer. After conditioning, each slurry 100 was transferred into the gas flow model and a 325 mesh fluid loss screen 90 was loaded into the bottom assembly 76 of the test cylinder. A back pressure regulator 78 was connected to the bottom assembly 76 to represent a low pressure permeable formation. The test cell assembly was installed into the pre-heated jacket 52 and a hydrostatic pressure 82 of 1000 psi, gas pressure 54 of 500 psi, and backpressure 78 of 300 psi were applied during each run. Hydrostatic pressure, cement pore pressure, piston movement, temperature, filtrate volume, water volume displaced by filtrate and/or gas volume were automatically monitored using the computer. Test data, including cement pore pressure, filtrate volume, water displaced by filtrate and/or gas volume are reflected in the attached gas flow model graphs (FIGS. 5–12).

Figure 12:
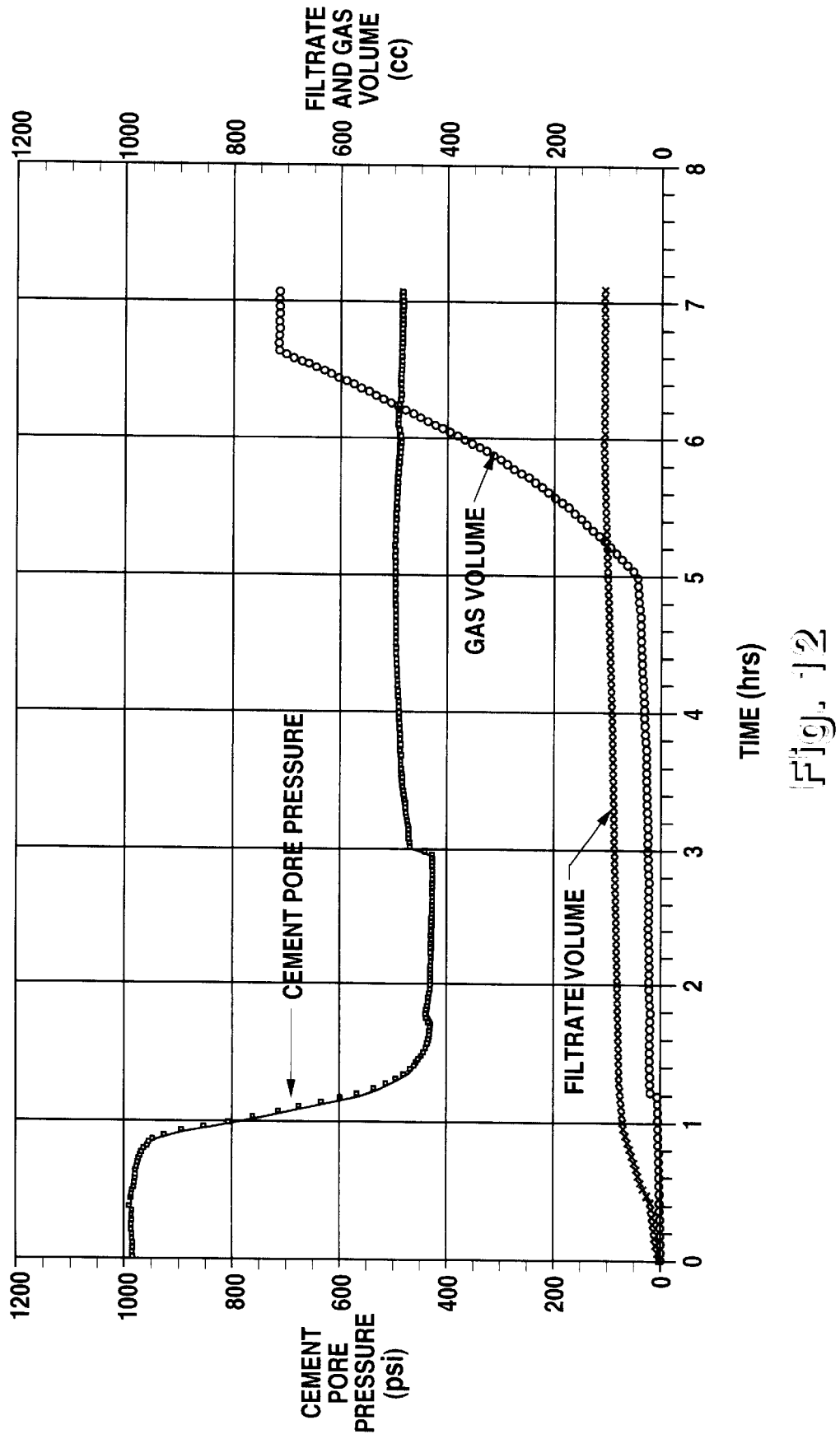
FIG. 12 shows cement pore pressure, gas volume, and filtrate volume as a function of time for the conventional cement slurry of Comparative Example B.

Using the gas model, cement pore pressure of each slurry sample begins decreasing over time with curing. However, when gas intrusion occurs into the curing cement, the cement pore pressure typically stops dropping and instead may increase (sometimes as a spike upward in the pore pressure) as may be seen in the data recorded in Comparative Example B (FIG. 12), reflecting the pressure of the invading fluid. When water displaced by filtrate is presented (FIGS. 7–10), gas intrusion will be evidenced by an increase in value of the water displaced by filtrate curve relative to the filtrate volume curve, indicating water displacement by gas. When the valve of water displacement by filtrate remains below the filtrate volume, no gas intrusion is indicated. Whether an increase is seen in pore pressure or not, gas intrusion into the slurry will typically be reflected by an increase in gas volume when this curve is presented, as may be seen in the data recorded in Comparative Examples A and B (FIGS. 11 and 12).

Example 3

In this example, an aluminum silicate-containing cement slurry was prepared using Inland Class G Cement formulated with 10% "METAMAX" aluminum silicate BWOC, 1.0% "FL-20" HEC-based fluid loss additive BWOC, 0.3% "CD-31" napthalene sulfonate dispersant BWOC, and 0.2% "R-3" sodium lignosulfonate cement retarder BWOC. The slurry was mixed to have density of 15.8 ppg and a yield of 1.25 ft$^3$ /sack, using 5.30 gallon/sack of fresh water.

Figure 5:
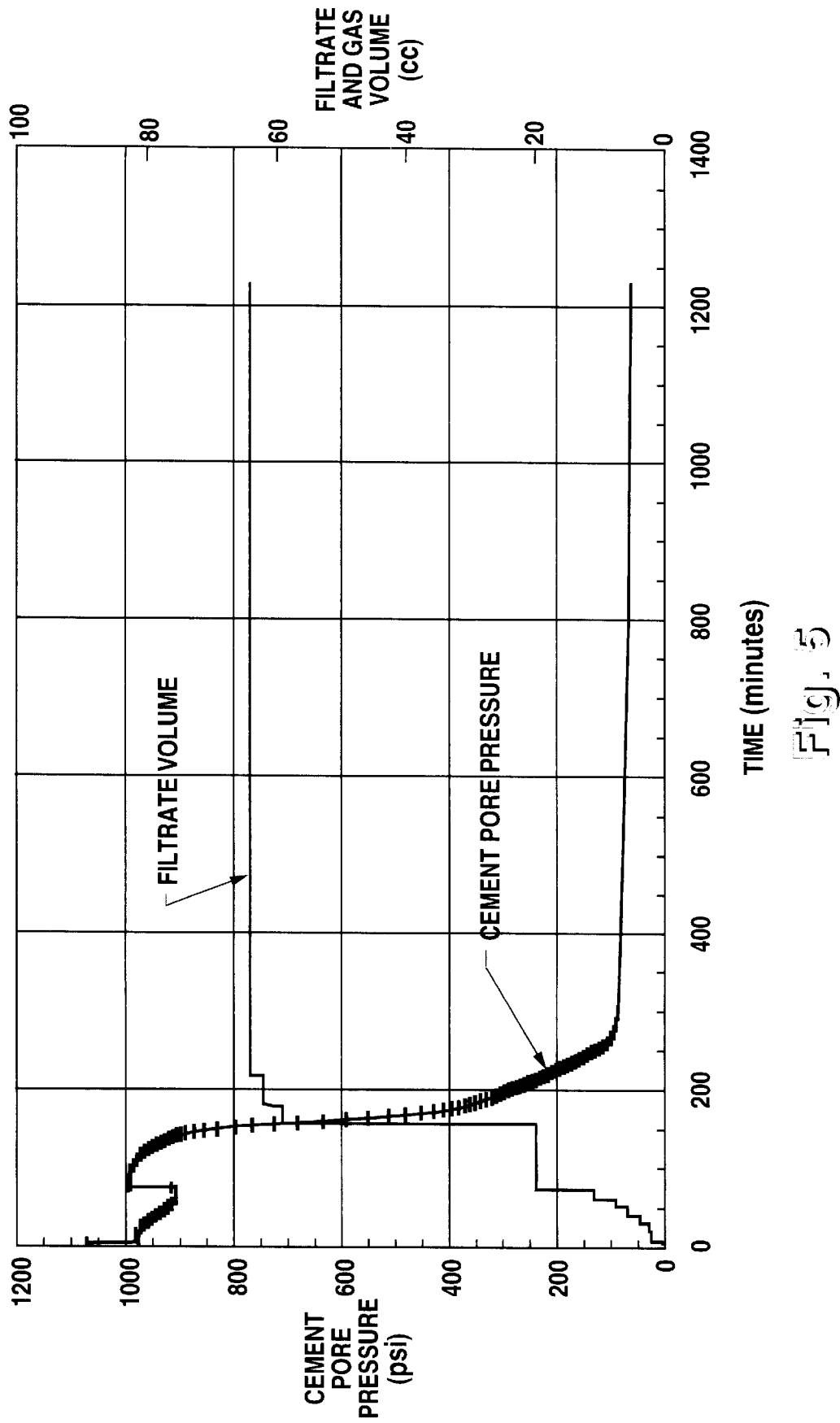
FIG. 5 shows cement pore pressure, and filtrate volume as a function of time for the aluminum silicate-containing cement slurry of Example 3 according to one embodiment of the disclosed method.

Results of the gas flow model testing on this slurry performed at 167° F. are presented in FIG. 5. As may be seen in FIG. 5, the cement pore pressure fell to less than 100 psi. Thickening time for this slurry was 4:26 hours at 167° F. As exhibited by the decline in pore pressure, the results of this example indicate that substantially no gas intrusion into the sample occurred.

Example 4

In this example, an aluminum silicate-containing cement slurry was prepared using UBE Class G Cement formulated with 10% "METAMAX" aluminum silicate BWOC, 1.0% "FL-20" HEC-based fluid loss additive BWOC, 0.3% "CD-31" napthalene sulfonate dispersant BWOC, and 0.35% "R-1" lignosulfonate cement retarder BWOC. The slurry was mixed to have density of 15.8 ppg and a yield of 1.25 ft$^3$/sack, using 5.30 gallon/sack of fresh water.

Figure 6:
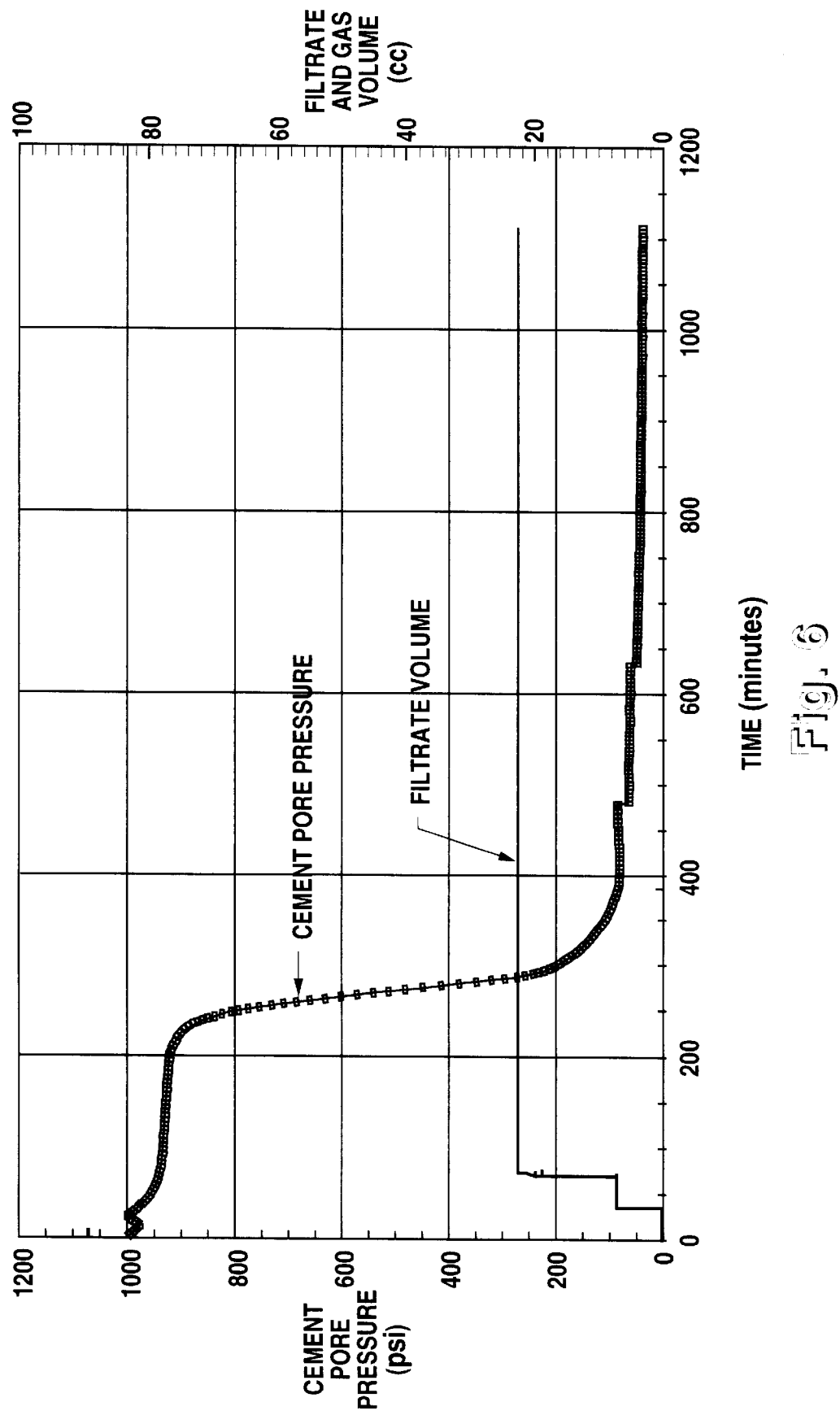
FIG. 6 shows cement pore pressure, and filtrate volume as a function of time for the aluminum silicate-containing cement slurry of Example 4 according to one embodiment of the disclosed method.

Results of the gas flow model testing on this slurry performed at 167° F. are presented in FIG. 6. Thickening time for this slurry was 3:26 hours at 167° F. As exhibited by the decline in pore pressure, the results of this example indicate that substantially no gas intrusion into the sample occurred.

Example 5

In this example, an aluminum silicate-containing cement slurry was prepared using Class H Cement formulated with 8% "METAMAX" aluminum silicate BWOC, 35% "S-8C" coarse silica sand BWOC (available from BJ Services), 50% hematite BWOC, 1.75% "FL-20" HEC-based fluid loss additive BWOC, 0.2% "R-3" sodium lignosulfonate cement retarder BWOC, and 0.2% "CD-31" napthalene sulfonate dispersant BWOC. The slurry was mixed to have a density of 18.5 ppg and a yield of 1.67 ft$^3$/sack, using 5.88 gallon/sack of fresh water.

Figure 7:
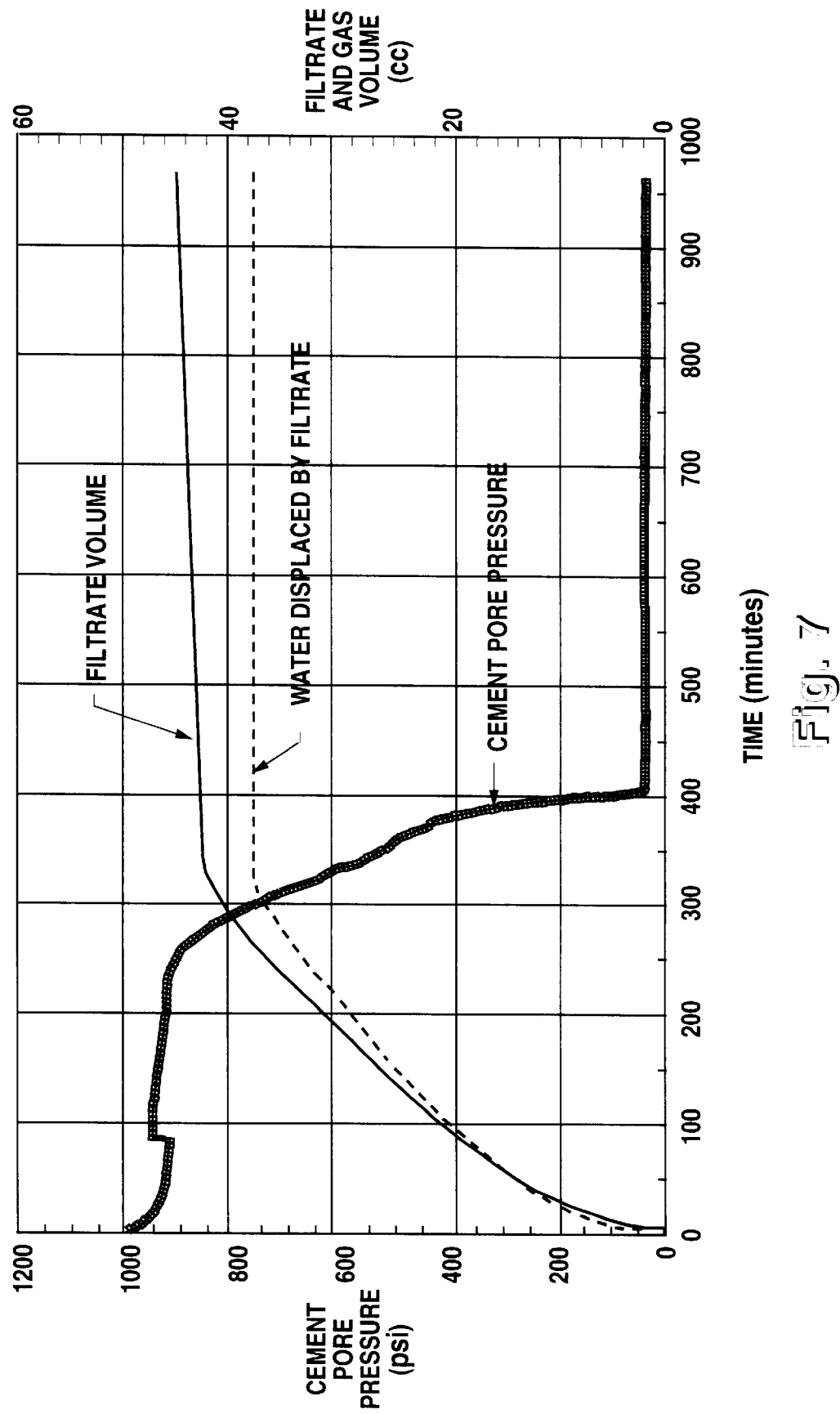
FIG. 7 shows cement pore pressure, water displaced by filtrate, and filtrate volume as a function of time for the aluminum silicate-containing cement slurry of Example 5 according to one embodiment of the disclosed method.

Results of the gas flow model testing on this slurry performed at 225° F. are presented in FIG. 7. Thickening time for this slurry was 5:03 hours at 225° F. As exhibited by the decline in pore pressure and the fact that the water displaced by filtrate remains less than the filtrate volume, the results of this example indicate that substantially no gas intrusion into the sample occurred.

Example 6

In this example, an aluminum silicate-containing cement slurry was prepared using Class H Cement formulated with 12% "METAMAX" aluminum silicate BWOC, 35% "S-8" silica flour BWOC, 0.4% "CD-31" napthalene sulfonate dispersant BWOC, 50 gallons per hundred sacks ("GHS") of "FL-32L" AMPS fluid loss additive, and 5.5 GHS of "R-15L" lignosulfonate liquid cement retarder (available from BJ Services). The slurry was mixed to have a density of 16.5 ppg and a yield of 1.50 ft$^3$ /sack, using 5.56 gallon/sack of fresh water.

Figure 8:
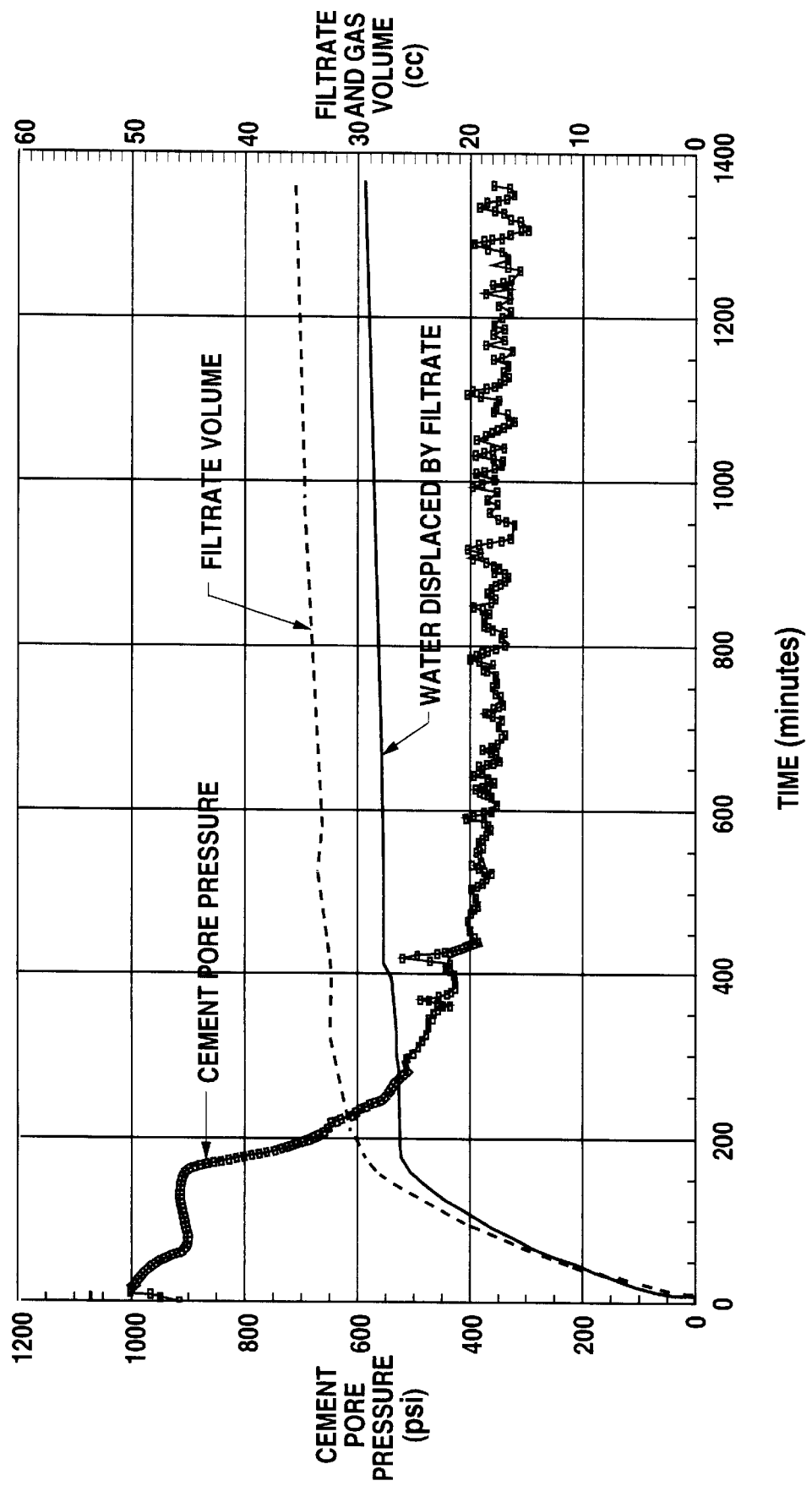
FIG. 8 shows cement pore pressure, water displaced by filtrate, and filtrate volume as a function of time for the aluminum silicate-containing cement slurry of Example 6 according to one embodiment of the disclosed method.

Results of the gas flow model testing on this slurry performed at 265° F. are presented in FIG. 8. Thickening time for this slurry was 3:36 hours at 265° F. As exhibited by the decline in pore pressure and the fact that the water displaced by filtrate remains less than the filtrate volume, the results of this example indicate that substantially no gas intrusion into the sample occurred.

Example 7

In this example, an aluminum silicate-containing cement slurry was prepared using Class H Cement formulated with 8% "METAMAX" aluminum silicate BWOC, and 1.0% "FL-19" HEC-based fluid loss additive BWOC (available from BJ Services). The slurry was mixed to have a density of 16.2 ppg and a yield of 1.17 ft$^3$/sack, using 4.77 gallon/sack of fresh water.

Figure 9:
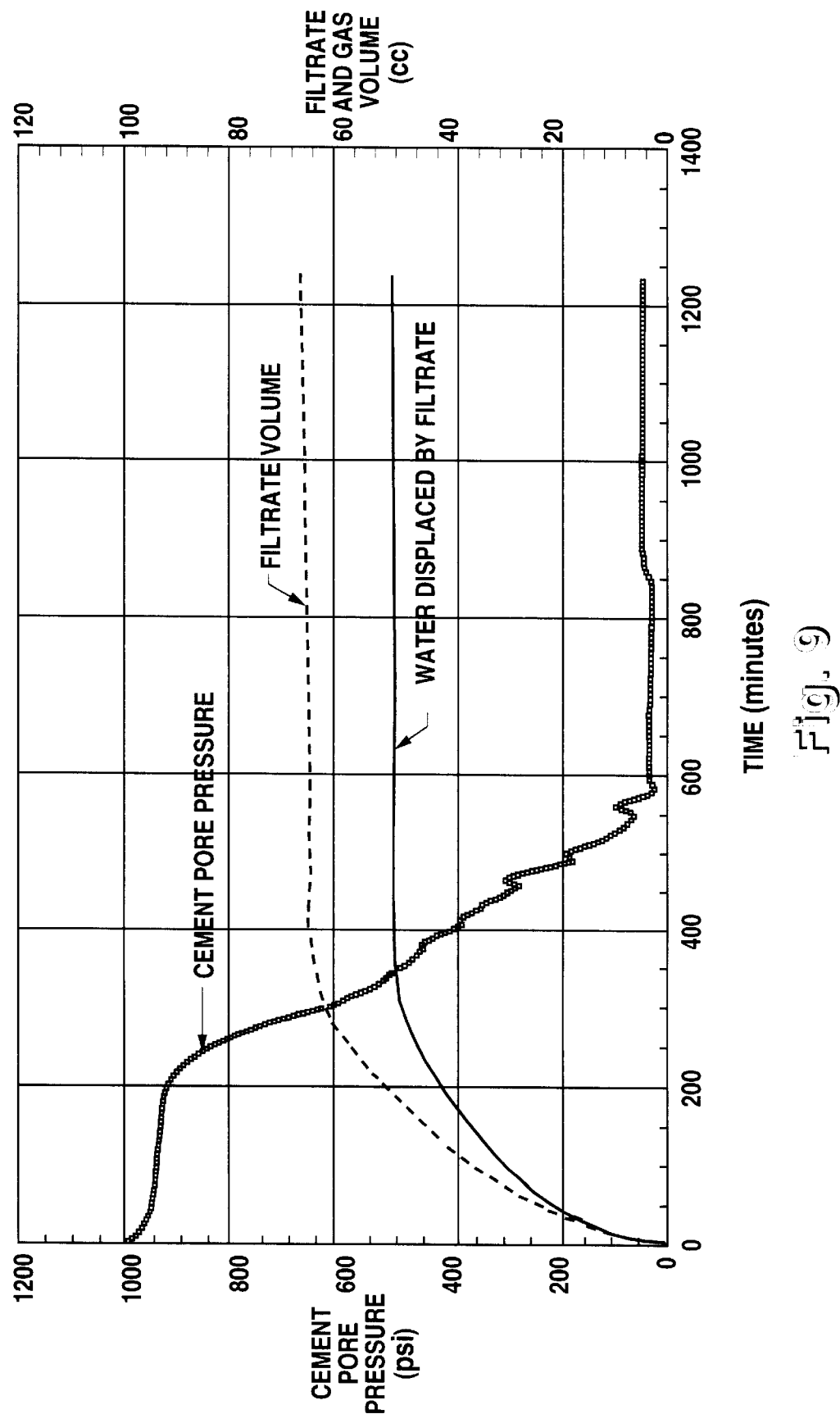
FIG. 9 shows cement pore pressure, water volume displaced by filtrate and filtrate volume as a function of time for the aluminum silicate-containing cement slurry of Example 7 according to one embodiment of the disclosed method.

Results of the gas flow model testing on this slurry performed at 120° F. are presented in FIG. 9. Thickening time for this slurry was 4:51 hours at 120° F. As exhibited by the decline in pore pressure and the fact that the water displaced by filtrate remains less than the filtrate volume, the results of this example indicate that substantially no gas intrusion into the sample occurred.

Example 8

In this example, an aluminum silicate-containing cement slurry was prepared using La Farge Class G Cement formulated with 10% "METAMAX" aluminum silicate BWOC, 1.0% BWOC "FL-62" polyvinyl alcohol-based fluid loss additive BWOC (available from BJ Services), and 0.2% "A-2" sodium metasilicate BWOC. The slurry was mixed to have a density of 15.8 ppg and a yield of 1.25 ft$^3$/sack, using 5.30 gallon/sack of fresh water (or 47.03% BWOC).

Results of the gas flow model testing on this slurry performed at 80° F. are presented in FIG. 10. The results of this example indicate that substantially no gas intrusion into the sample occurred. As exhibited by the decline in pore pressure and the fact that the water displaced by filtrate remains less than the filtrate volume, the results of this example indicate that substantially no gas intrusion into the sample occurred.

Comparative Examples A and B

Gas Intrusion in Conventional Cements

The gas flow model of FIG. 3 was used to evaluate gas intrusion characteristics of two conventional cement slurries in comparative examples A and B.

Comparative Example A

In this example, a conventional cement slurry was prepared using La Farge Class G Cement formulated with 1.2% "FL-62" polyvinyl alcohol-based fluid loss additive BWOC, 0.3% "CD-32" ethoxylated naphthalene sulfonate dispersant BWOC, and 5.0% sodium chloride. The slurry was mixed to have a density of 15.9 ppg and a yield of 1.17 ft$^3$/sack, using 4.96 gallon/sack of fresh water.

Results of the gas flow model testing on this slurry performed at 80° F. are presented in FIG. 11. As may be seen in FIG. 11, the cement pore pressure fell to below about 400 psi. However, gas volume rose to above about 500 cc. The results of this example indicate that gas intrusion into the conventional cement sample occurred.

Comparative Example B

In this example, a conventional cement slurry was prepared using La Farge Class G Cement formulated with 0.7% "FL-19" HEC-based fluid loss additive BWOC, 7.0 GHS "A-3L" liquid sodium silicate, and 2.0 GHS "FP-6L" defoamer. The slurry was mixed to have a density of 15.9 ppg and a yield of 1.14 ft$^3$/sack, using 4.96 gallon/sack of fresh water.

Results of the gas flow model testing on this slurry performed at 80° F. are presented in FIG. 12. As may be seen in FIG. 12, the cement pore pressure fell to below about 450 psi, but spiked upward to close to 500 psi at 3 hours. In addition, gas volume rose to above about 700 cc. The results of this example indicate that gas intrusion into the conventional cement sample occurred.

Example 9

In this example, pozzolan (fly ash)-containing and "METAMAX" aluminum silicate-containing cements were compared. Bentonite was added to both types of slurries where necessary to obtain sufficient viscosity. Components, amounts, and mixing characteristics of each slurry mix are listed in Table 5. Curing characteristics of each mix are listed in Table 6. The slurries were evaluated at temperatures ranging from 80° F. to 125° F. Mix No. 3 was prehydrated and shows similar thickening times as Mix No. 2.

As may be seen in Table 6 for any given mix ratio and/or density, the aluminum silicate-containing cement slurry gave increased compressive strength over similar low density slurries containing fly ash at 24 hours, 72 hours, and 21 days. Comparing Mix No. 1 and Mix No. 2, for example, shows that increased compressive strength was obtained with the aluminum silicate-containing slurry Mix No. 2 over the pozzolan-containing Mix No. 1. Furthermore, Mix No. 2 had very similar slurry rheologies as Mix No. 2, but with much less free water and no bentonite required.

TABLE 5

Mixing Characteristics of Pozzolan and Aluminum Silicate-Containing Cement Slurries (Example 8)

| Mix # | Type Mix | Mix Ratio | Class Cement | Density ppg. | Yield cuft/ks | F. Water gal/sk | Pozzolan (Fly Ash) Class C (Pounds) | Cement (Pounds) | Bentonite (Pounds) | "METAMAX" Aluminum Silicate (Pounds) | "A-5" (NaCl) (%) | (BWOW) Pounds | "R-3" (%) (BWOB) | "A-2" (%) (BWOC) |
|---|---|---|---|---|---|---|---|---|---|---|---|---|---|---|
| 1 | P | 35:65:6 | A | 12.4 | 2.16 | 12.40 | 25.9 | 61.1 | 5.22 | — | 5.0 | 5.17 | — | — |
| 2 | AS |  | A | 12.4 | 2.00 | 11.24 | — | 61.1 | — | 25.9 | 5.0 | 4.68 | — | — |
| 3 | AS |  | A | 12.4 | 2.00 | 11.24 | — | 61.1 | — | P.H. 25.9 | 5.0 | 4.68 | — | — |
| 4 | P | 15:85:8 | A | 12.4 | 2.28 | 12.91 | 11.1 | 79.9 | 7.28 |  | 5.0 | 5.38 | — | — |
| 5 | AS |  | A | 12.4 | 2.29 | 12.95 | — | 79.9 | 7.28 | 11.1 | 5.0 | 5.42 | — | — |
| 6 | P | 15:85:8 | A | 12.2 | 2.41 | 13.84 | 11.1 | 79.9 | 7.28 |  | 5.0 | 5.77 | — | — |
| 7 | AS |  | A | 12.2 | 2.37 | 13.67 | — | 79.9 | 5.46 | 11.1 | 5.0 | 5.18 | — | — |
| 8 | P | 40:60:8 | A | 12.2 | 2.21 | 12.42 | 29.6 | 56.4 | 6.88 |  | 5.0 | 5.70 | — | — |
| 9 | AS |  | A | 12.2 | 1.95 | 10.98 | — | 56.4 | — | 29.6 | 5.0 | 4.95 | — | — |
| 10 | AS |  | A | 12.2 | 1.95 | 10.98 | — | 56.4 | — | 29.6 | — | — | 0.3% 0.26# | — |
| 11 | P | 1:0:0 | A | 12.2 | 2.25 | 13.16 | — | — | — | — | — | — | — | 2.0% 1.88# |
| 12 | P | 35:65:6 | H | 12.7 | 1.85 | 10.00 | 25.9 | 61.1 | 5.22 | — | — | — | — | — |
| 13 | AS |  | H | 12.7 | 1.76 | 9.56 | — | 61.1 | — | 25.9 | — | — | — | — |
| 14 | P | 35:65:6 | G | 12.7 | 1.85 | 10.00 | 25.9 | 61.1 | 5.22 |  | — | — | — | — |
| 15 | AS |  | G | 12.7 | 1.76 | 9.56 | — | 61.1 | — | 25.9 | — | — | — | — |

BWOW — By weight of the mix water
BWOC — By weight of cement
BWOB — By weight of blend (cement/"METAMAX")
P.H. — Means additive was pre-hydrated in the mix water
P — Slurry design with Pozzolan (Fly Ash) mix
AS — Slurry design with "METAMAX" aluminum silicate
Mix Ratio — Given for Pozzolan slurries as — pozzolan:hydraulic cement:bentonite.

TABLE 6

Properties of Pozzolan and Aluminum Silicate Containing Cements (Example 8)

| Mix # | Type Mix | Mix Ratio | Class Cmt | Den. ppg. | Temp. deg F. | T. time hours | Comp. Strength (psi) 24 hrs | Comp. Strength (psi) 72 hrs | Comp. Strength (psi) 21 days | Free Water (%) | Rheology 300 | Rheology 200 | Rheology 100 | Rheology 6 | Rheology 3 | Rheology 600 | Perm. to water (md) |
|---|---|---|---|---|---|---|---|---|---|---|---|---|---|---|---|---|---|
| 1 | P | 35:55:6 | A | 12.4 | 80 | 6:33 | 292 | 694 | 1165 | 1.44 | 53 | 49 | 45 | 25 | 18 | 63 | 0.0013 |
| 2 | AS |  | A | 12.4 | 80 | 4:07 | 749 | 2056 | 2475 | 0.08 | 50 | 45 | 38 | 23 | 19 | 65 | 0.0007 |
| 3 | AS |  | A | 12.4 | 80 | 4:08 |  |  |  |  |  |  |  |  |  |  |  |
| 4 | P | 15:85:6 | A | 12.4 | 80 | 5:08 | 445 | 741 | 1180 | 0.92 | 61 | 57 | 53 | 30 | 22 | 66 | 0.0014 |
| 5 | AS |  | A | 12.4 | 80 | 4:12 | 514 | 1369 | 1670 | 0.32 | 78 | 73 | 67 | 38 | 28 | 90 | 0.0009 |
| 6 | P | 15:85:6 | A | 12.2 | 80 | 5:32 | 182 | 535 | 1068 | 1.20 | 38 | 36 | 32 | 18 | 12 | 48 | 0.0037 |
| 7 | AS |  | A | 12.2 | 80 | 4:21 | 219 | 988 | 1531 | 0.56 | 38 | 34 | 30 | 19 | 14 | 48 | 0.0028 |
| 8 | P | 40:50:8 | A | 12.2 | 80 | 4:52 | 237 | 598 | 10S0 | 1.00 | 48 | 44 | 39 | 17 | 12 | 59 | 0.0030 |
| 8 | P | 40:60:8 | A | 12.2 | 100 | 3:09 |  |  |  |  |  |  |  |  |  |  |  |
| 8 | P | 40:60:8 | A | 12.2 | 125 | 2:37 |  |  |  | 0.32 | 53 | 51 | 47 | 19 | 14 | 59 |  |
| 9 | AS |  | A | 12.2 | 80 | 3:38 | 691 | 1556 | 2875 | 0.00 | 55 | 53 | 49 | 20 | 16 | 61 | 0.0017 |
| 9 | AS |  | A | 12.2 | 100 | 2:14 |  |  |  |  |  |  |  |  |  |  |  |
| 10 | AS |  | A | 12.2 | 125 | 2:01 |  |  |  | 0.16 | 44 | 40 | 33 | 18 | 12 | 57 |  |
| 11 | P | 1:0:0 | A | 12.2 | 80 | 4:21 | 498 | 769 | 1169 | TRACE | 40 | 37 | 32 | 21 | 15 | 48 |  |
| 12 | P | 35:65:6 | H | 12.7 | 103 | 5:21 |  |  |  | 0.96 | 131 | 124 | 115 | 43 | 34 | 145 |  |
| 12 | P | 35:65:6 | H | 12.7 | 120 |  | 165 | 355 | 781 |  |  |  |  |  |  |  |  |
| 13 | AS |  | H | 12.7 | 103 | 3:12 |  |  |  | 0.00 | 93 | 82 | 70 | 30 | 22 | 103 |  |
| 13 | AS |  | H | 12.7 | 120 |  | 683 | 1788 | 2544 |  |  |  |  |  |  |  |  |
| 14 | P | 35:65:6 | G | 12.7 | 103 | 3:29 |  |  |  | 0.32 | 161 | 153 | 136 | 44 | 35 | 175 |  |
| 14 | P | 35:65:6 | G | 12.7 | 120 |  | 163 | 416 | 863 |  |  |  |  |  |  |  |  |
| 15 | AS |  | G | 12.7 | 103 | 2:29 |  |  |  | 0.00 | 142 | 126 | 108 | 38 | 29 | 153 |  |
| 15 | AS |  | G | 12.7 | 120 |  | 619 | 2038 | 2813 |  |  |  |  |  |  |  |  |

Although particular exemplary embodiments of the disclosed compositions have been described and illustrated herein, it will be understood with benefit of this disclosure that benefits of the disclosed cement compositions and cementing methods may be realized in any type of wellbore cementing application, including in completion, remedial, workover, and/or abandonment cementing applications using cementing methods known in the art. Examples of specific applications include, but are not limited to, cementing casing and liner strings, inflatable packers, squeezing perforations and casing leaks, etc.

While the invention may be adaptable to various modifications and alternative forms, specific embodiments have been shown by way of example and described herein. However, it should be understood that the invention is not intended to be limited to the particular forms disclosed.

Rather, the invention is to cover all modifications, equivalents, and alternatives falling within the spirit and scope of the invention as defined by the appended claims. Moreover, the different aspects of the disclosed compositions and methods may be utilized in various combinations and/or independently. Thus the invention is not limited to only those combinations shown herein, but rather may include other combinations.

What is claimed is:

1. A method of cementing within a wellbore, comprising:
    introducing a cement slurry comprising a hydraulic cement and aluminum silicate into a wellbore; and
    allowing said cement slurry to set within said wellbore;
    wherein said wellbore is located in a seafloor at a water depth greater than about 1000 feet; and
    wherein said aluminum silicate comprises at least one of kaolin, metakaolin, halloysite, dickite, nacrite, or a mixture thereof.

2. The method of claim 1, wherein said introducing further comprises introducing said cement slurry into an annulus existing between a pipe and said wellbore.

3. The method of claim 1, wherein said allowing further comprises allowing said cement slurry to set at a temperature of less than about 60° F.

4. The method of claim 1, wherein said cement slurry substantially prevents intrusion of fluids into said wellbore prior to and after setting of said cement slurry.

5. The method of claim 1, wherein said cement slurry comprises between about 1% and about 75% of aluminum silicate by weight of cement.

6. The method of claim 5, wherein said cement slurry further comprises gypsum.

7. The method of claim 1, wherein said cement slurry further comprises a foaming agent and energizing phase.

8. The method of claim 1, wherein said aluminum silicate comprises at least one of kaolin, metakaolin, or a mixture thereof.

9. The method of claim 1, wherein said aluminum silicate comprises metakaolin.

10. The method of claim 1, wherein said cement slurry has a transition time of about 35 minutes or less at a temperature of about 50° F.

11. A method of cementing within a wellbore, comprising:
    introducing a cement slurry comprising a hydraulic cement and aluminum silicate into a wellbore; and
    allowing said cement slurry to set within said wellbore at a temperature of less than about 60° F.;
    wherein said aluminum silicate comprises at least one of kaolin, metakaolin, halloysite, dickite, nacrite, or a mixture thereof.

12. The method of claim 11, wherein said introducing further comprises introducing said cement slurry into an annulus existing between a pipe and said wellbore.

13. The method of claim 11, wherein said cement slurry substantially prevents intrusion of fluids into said wellbore prior to and after setting of said cement slurry.

14. The method of claim 11, wherein said cement slurry comprises between about 1% and about 75% of aluminum silicate by weight of cement.

15. The method of claim 14, wherein said cement slurry further comprises gypsum.

16. The method of claim 11, wherein said cement slurry further comprises a foaming agent and energizing phase.

17. The method of claim 11, wherein said aluminum silicate comprises at least one of kaolin, metakaolin, or a mixture thereof.

18. The method of claim 11, wherein said aluminum silicate comprises metakaolin.

19. The method of claim 11 wherein said cement slurry has a transition time of about 35 minutes or less at a temperature of about 50° F.

20. A method of cementing within a wellbore, comprising:
    introducing a cement slurry comprising a hydraulic cement into an annulus existing between a pipe and said wellbore; and
    allowing said cement slurry to set within said wellbore;
    wherein said wellbore is located in a seafloor at a water depth greater than about 1000 feet, and wherein said cement slurry substantially prevents intrusion of fluids into said wellbore prior to and after setting of said cement slurry; and
    wherein said cement slurry comprises between about 1% and about 25% metakaolin by weight of cement; and
    wherein said cement slurry further comprises a foaming agent, and an energizing phase.

21. The method of claim 20 wherein said allowing further comprises allowing said cement slurry to set at a temperature of less than about 60° F.

22. The method of claim 20 wherein said cement slurry further comprises between about 1% and about 15% of gypsum by weight of cement.

23. The method of claim 20, wherein said cement slurry comprises from about 0.01 gallons per sack to about 0.5 gallons per sack of foaming agent and from about 50 standard cubic feet of nitrogen energizing phase at standard conditions per barrel of unfoamed cement slurry to about 2000 standard cubic feet of nitrogen energizing phase at standard conditions per barrel of unfoamed cement slurry.

24. The method of claim 20 wherein said cement slurry has a transition time of about 40 minutes or less at a temperature of about 50° F.

25. A method of cementing within a wellbore, comprising:
    introducing a cement slurry comprising a hydraulic cement and aluminum silicate into a wellbore; and
    allowing said cement slurry to set within said wellbore;
    wherein said wellbore penetrates at least one formation having a pore pressure and being at least partially productive of a fluid;
    wherein said cement slurry substantially prevents intrusion of said fluid into said into said wellbore prior to and after setting of said cement slurry; and
    wherein said aluminum silicate comprises at least one of kaolin, metakaolin, halloysite, dickite, nacrite, or a mixture thereof.

26. The method of claim 25, wherein said fluid is gas.

27. The method of claim 25, wherein said introducing further comprises introducing said cement slurry into an annulus existing between a pipe and said wellbore.

28. The method of claim 25, wherein said cement slurry has a pore pressure and said formation has a pore pressure, and wherein said slurry substantially prevents intrusion of said fluid into said wellbore prior to setting of said cement when said cement pore pressure is less than said formation pore pressure.

29. The method of claim 25, wherein said cement slurry comprises between about 1% and about 75% of aluminum silicate by weight of cement.

30. The method of claim 29, wherein said cement slurry further comprises gypsum.

31. The method of claim 25, wherein said aluminum silicate comprises at least one of kaolin, metakaolin, or a mixture thereof.

32. The method of claim 25, wherein said aluminum silicate comprises metakaolin.

33. A method of cementing within a wellbore, consisting essentially of:
   introducing a cement slurry comprising a hydraulic cement and aluminum silicate into a wellbore; and
   allowing said cement slurry to set within said wellbore;
   wherein said aluminum silicate comprises at least one of kaolin, metakaolin, halloysite, dickite, nacrite, or a mixture thereof.

34. The method of claim 33, wherein said aluminum silicate comprises metakaolin.

35. The method of claim 34, wherein said slurry has a slurry density of between about 11.5 lbm/gal and about 13.5 lbm/gal.

36. A method of cementing within a wellbore, comprising:
   introducing a cement slurry comprising a hydraulic cement and aluminum silicate into a wellbore; and
   allowing said cement slurry to set within said wellbore;
   wherein said aluminum silicate comprises at least one of kaolin, metakaolin, halloysite, dickite, nacrite, or a mixture thereof; and
   wherein said introduction of said cement slurry is preceded by introduction of a spacer fluid into said wellbore which serves to displace and substantially remove any drilling mud present in said wellbore.

37. The method of claim 36, wherein said aluminum silicate comprises metakaolin.

* * * * *

UNITED STATES PATENT AND TRADEMARK OFFICE
CERTIFICATE OF CORRECTION

PATENT NO.: 6,145,591
DATED: November 14, 2000
INVENTOR(S): Boncan et al.

It is certified that error appears in the above-identified patent and that said Letters Patent is hereby corrected as shown below:

In claim 23, column 28, line 28, delete "foam ing," and insert --foaming--.

Signed and Sealed this

First Day of May, 2001

Attest:

NICHOLAS P. GODICI

Attesting Officer    Acting Director of the United States Patent and Trademark Office

(12) EX PARTE REEXAMINATION CERTIFICATE (6662nd)
United States Patent
Boncan et al.

(10) Number: US 6,145,591 C1
(45) Certificate Issued: Feb. 17, 2009

(54) METHOD AND COMPOSITIONS FOR USE IN CEMENTING

(75) Inventors: Virgilio G. Boncan, Spring, TX (US);
Dan T. Mueller, Cypress, TX (US);
Murray J. Rogers, Houston, TX (US);
Windall S. Bray, Cypress, TX (US)

(73) Assignee: BJ Services Company, Houston, TX (US)

Reexamination Request:
No. 90/008,755, Jul. 19, 2007

Reexamination Certificate for:
Patent No.: 6,145,591
Issued: Nov. 14, 2000
Appl. No.: 08/989,480
Filed: Dec. 12, 1997

Certificate of Correction issued May 1, 2001.

(51) Int. Cl.
*E21B 33/14* (2006.01)

(52) U.S. Cl. .................. 166/291; 166/292; 166/293; 106/614; 106/696; 106/718; 106/719

(58) Field of Classification Search .......... 166/291–293; 106/614, 694, 718, 719
See application file for complete search history.

(56) References Cited

U.S. PATENT DOCUMENTS

| | | | |
|---|---|---|---|
| 3,937,282 A | 2/1976 | Shryock et al. |
| 4,202,413 A | 5/1980 | Messenger |
| 4,256,500 A | 3/1981 | Turpin, Jr. |
| RE32,742 E | 9/1988 | Shjeldal |
| 4,842,649 A | 6/1989 | Heitzmann et al. |
| 5,346,012 A | 9/1994 | Heathman et al. |
| 5,484,019 A | 1/1996 | Griffith |
| 5,531,824 A | 7/1996 | Burkes et al. |
| 5,755,876 A | 5/1998 | Stokes et al. |

OTHER PUBLICATIONS

Dwight K. Smith, A New Material for Deep Well Cementing, Petroleum Transactions, 1956, AIME.

Ralph E. Grim, Applied Clay Mineralogy, 1962, McGraw–Hill Book Company, Inc., New York, Toronto, and London.

Pat N. Parker, Specialty Cements Can Solve Special Problems, The Oil and Gas Journal, Feb. 28, 1977, Pennwell Publishing, Tulsa, OK.

Richard C. Mielenz, Mineral Admixtures—History and Background, Concrete International, Aug. 1983.

Jean Ambroise, Sandrine Maximilien, & Jean Pera, Properties of Metakaolin Blended Cements, Advn. Cem. Bas. Mat. 1994; 1:161–168, 1994, France.

Bryant Mather, Richard C. Mielenz, Terry Patzias, Paul J. Tikalsky, & Orivilly R. Werner II, Use of Natural Pozzolans in Concrete, ACI Committee Reports, Nov. 11, 1994, USA.

Changling He, Emil Makovicky, & Bjarne Osbaeck, Thermal Stability & Pozzolanic Activity of Calcined Kaolin, Applied Clay Science 9, pp. 165–187, 1994, Denmark.

Michael A. Calderone, Karen A. Gruberm, & Ronald G. Burg, High–Reactivity Metakaolin: A New Generation of Mineral Admixture, Concrete International, pp. 37–40, Nov. 1994.

Don Marsh, An Alternative to Silica Fume, Concrete Prducts, Nov. 1994.

J.M. Khatib & S. Wild, Pore Size Distribution of Metakaolin Paste, Cement and Concrete Research, vol. 26, No. 10, pp. 1545–1553, 1996.

S. Wild, J.M. Khatib, & A. Jones, Relative Strength, Pozzolanic Activity & Cement Hydration in Superplasticized Matakaolin Paste, Cement & Con. Pesearch, vol. 26, No. 10, 1996.

*Primary Examiner*—Matthew C. Graham

(57) ABSTRACT

Aluminum silicate-containing cement slurries for cementing wellbores in deepwater and cold environments, or in wellbores susceptible to fluid intrusion. The aluminum silicate-containing slurries may also be used as high strength, low density cements for wellbore cementing applications under a variety of conditions. The cement slurries typically comprise a mixture of a reactive aluminum silicate and hydraulic cement, and may include one or more other additives. The cement slurries may optionally be foamed using a foaming agent and energizing phase.

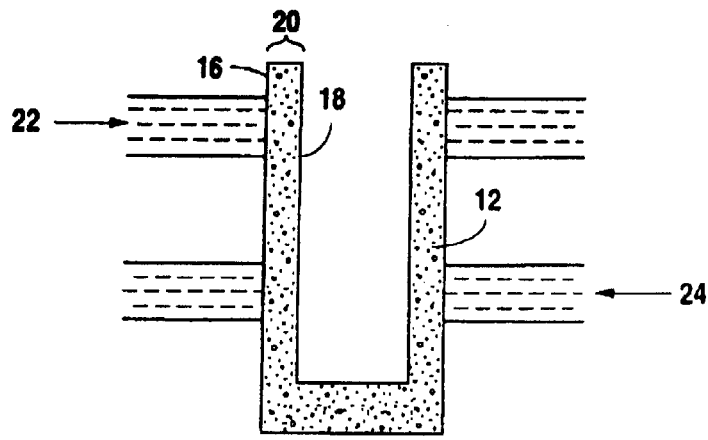

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 11, 20, 25, 33 and 36 are determined to be patentable as amended.

Claims 2–10, 12–19, 21–24, 26–32, 34–35 and 37, dependent on an amended claim, are determined to be patentable.

1. A method of cementing within a wellbore, comprising:
   introducing a cement slurry comprising a hydraulic cement and aluminum silicate into a wellbore; and
   allowing said cement slurry to set within said wellbore;
   wherein said wellbore is located in a seafloor at a water depth greater than about 1000 feet; and
   wherein said aluminum silicate comprises at least one of kaolin, metakaolin, halloysite, dickite, nacrite, or a mixture thereof, *and wherein the cement slurry develops a compressive strength of about 50 psi or more in about 9 hours at a temperature of about 50° F.*

11. A method of cementing within a wellbore, comprising:
    introducing a cement slurry comprising a hydraulic cement and aluminum silicate into a wellbore; and
    allowing said cement slurry to set within said wellbore at a temperature of less than about 60° F., *wherein the cement slurry develops a compressive strength of about 50 psi or more in about 9 hours at a temperature of about 50° F.;*
    wherein said aluminum silicate comprises at least one of kaolin, metakaolin, halloysite, dickite, nacrite, or a mixture thereof.

20. A method of cementing within a wellbore, comprising:
    introducing a cement slurry comprising a hydraulic cement into an annulus existing between a pipe and said wellbore, *wherein the cement slurry develops a compressive strength of about 50 psi or more in about 9 hours at a temperature of about 50° F.;* and
    allowing said cement slurry to set within said wellbore;
    wherein said wellbore is located in a seafloor at a water depth greater than about 1000 feet, and wherein said cement slurry substantially prevents intrusion of fluids into said wellbore prior to and after setting of said cement slurry; and
    wherein said cement slurry comprises between about 1% and about 25% metakaolin by weight of cement; and
    wherein said cement slurry further comprises a foaming agent, and an energizing phase.

25. A method of cementing within a wellbore, comprising:
    introducing a cement slurry comprising a hydraulic cement and aluminum silicate into a wellbore, *wherein the cement slurry develops a compressive strength of about 50 psi or more in about 9 hours at a temperature of about 50° F.;* and
    allowing said cement slurry to set within said wellbore;
    wherein said wellbore penetrates at least one formation having a pore pressure and being at least partially productive of a fluid;
    wherein said cement slurry substantially prevents intrusion of said fluid into said into said wellbore prior to and after setting of said cement slurry; and
    wherein said aluminum silicate comprises at least one of kaolin, metakaolin, halloysite, dickite, nacrite, or a mixture thereof.

33. A method of cementing within a wellbore, consisting essentially of:
    introducing a cement slurry comprising a hydraulic cement and aluminum silicate into a wellbore, *wherein the cement slurry develops a compressive strength of about 50 psi or more in about 9 hours at a temperature of about 50° F.;*
    allowing said cement slurry to set within said wellbore;
    wherein said aluminum silicate comprises at least one of kaolin, metakaolin, halloysite, dickite, nacrite, or a mixture thereof.

36. A method of cementing within a wellbore, comprising:
    introducing a cement slurry comprising a hydraulic cement and aluminum silicate into a wellbore, *wherein the cement slurry develops a compressive strength of about 50 psi or more in about 9 hours at a temperature of about 50° F.;* and
    allowing said cement slurry to set within said wellbore;
    wherein said aluminun silicate comprises at least one of kaolin, metakaolin, halloysite, dickite, nacrite, or a mixture thereof; and
    wherein said introduction of said cement slurry is preceded by introduction of a spacer fluid into said wellbore which serves to displace and substantially remove any drilling mud present in said wellbore.

\* \* \* \* \*